(12) United States Patent
Yamashita

(10) Patent No.: US 9,081,430 B2
(45) Date of Patent: Jul. 14, 2015

(54) POINTING CONTROL DEVICE, INTEGRATED CIRCUIT THEREOF AND POINTING CONTROL METHOD

(75) Inventor: Kazuhiko Yamashita, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 276 days.

(21) Appl. No.: 13/701,944

(22) PCT Filed: Apr. 5, 2012

(86) PCT No.: PCT/JP2012/002376
§ 371 (c)(1),
(2), (4) Date: Dec. 4, 2012

(87) PCT Pub. No.: WO2012/144145
PCT Pub. Date: Oct. 26, 2012

(65) Prior Publication Data
US 2013/0076625 A1 Mar. 28, 2013

(30) Foreign Application Priority Data

Apr. 22, 2011 (JP) .................. 2011-095745

(51) Int. Cl.
*G06F 3/041* (2006.01)
*G06F 3/03* (2006.01)
(52) U.S. Cl.
CPC .............. *G06F 3/041* (2013.01); *G06F 3/0304* (2013.01)
(58) Field of Classification Search
None
See application file for complete search history.

(56) References Cited

U.S. PATENT DOCUMENTS

| 6,353,764 B1 | 3/2002 | Imagawa et al. |
| 6,434,255 B1 | 8/2002 | Harakawa |
| 2005/0248529 A1* | 11/2005 | Endoh ........................... 345/156 |
| 2008/0013826 A1* | 1/2008 | Hillis et al. ................... 382/154 |

FOREIGN PATENT DOCUMENTS

| JP | 4-271423 | 9/1992 |
| JP | 5-19957 | 1/1993 |
| JP | 11-134089 | 5/1999 |
| JP | 11-327753 | 11/1999 |
| JP | 2006-209359 | 8/2006 |
| JP | 2007-226397 | 9/2007 |

OTHER PUBLICATIONS

International Search Report issued Jun. 5, 2012 in International (PCT) Application No. PCT/JP2012/002376.

* cited by examiner

*Primary Examiner* — David D Davis
(74) *Attorney, Agent, or Firm* — Wenderoth, Lind & Ponack L.L.P.

(57) ABSTRACT

When a plurality of operators perform pointing operations, a pointing control device selects a pointer for determining a position to be pointed from among the operators by using the distance between a face and a fingertip or a substitute for a fingertip of each operator. The pointing device calculates the distance between the face and the fingertip or the substitute for each operator by using a position of the face and a position of the fingertip or the substitute, selects a pointer from the operators by using the calculated distance, and calculates a position of a cursor for a pointing operation based on the position of the fingertip or the substitute calculated for the selected pointer. A pointer can be selected regardless of the number of operators, and a pointer can easily change to another operator.

12 Claims, 15 Drawing Sheets

POINTING CONTROL DEVICE, INTEGRATED CIRCUIT THEREOF AND POINTING CONTROL METHOD

TECHNICAL FIELD

The present invention relates to a pointing control technology for recognizing a pointing operation performed by an operator for pointing at a position on a screen.

BACKGROUND ART

Nowadays, in many conferences, it has become common to project images displayed on a personal computer and the like on a large screen by using a projector and the like, and attendees view the projected screen. In such conferences, attendees make explanations, ask questions, etc., while pointing at figures or characters on the screen.

There are some means of pointing at figures or characters on the projected screen. For example, a user uses a pointing stick or a laser pointer to directly point at the projected screen. As another means, a user uses an input device such as a mouse and a pointing device to move a cursor on the screen displaying figures and characters so as to point at the figures and characters (for example, see Patent Literature 3).

Further, as a pointing method in which a user does not use an input device, etc., there has been known a technology of detecting a fingertip of the user to display a cursor and allowing the user to point with the cursor (for example, see Patent Literature 1, Patent Literature 2 and Patent Literature 4).

Patent Literature 1, Patent Literature 2 and Patent Literature 4 disclose a technology of allowing a user to perform a pointing operation by detecting a fingertip position of the user based on a plurality of images acquired by an imaging unit such as a camera.

CITATION LIST

Patent Literature

[Patent Literature 1]
Japanese Patent Application Publication No. H4-271423
[Patent Literature 2]
Japanese Patent Application Publication No. H5-19957
[Patent Literature 3]
Japanese Patent Application Publication No. 2007-226397
[Patent Literature 4]
Japanese Patent Application Publication No. 2006-209359

SUMMARY OF INVENTION

Technical Problem

However, according to the technology disclosed in Patent Literature 1, Patent Literature 2 and Patent Literature 4, only one cursor is used for pointing, and accordingly, it is presumed that only one fingertip is included in images acquired by the imaging unit. The number of cursors used for pointing is not limited to one, and two or more cursors may be used. With the conventional technologies, however, it is impossible to select fingertips for moving cursors when the number of fingertips in the images is more than the number of cursors, and this is problematic.

The present invention has an aim to provide a pointing control technology for selecting a pointer from among operators, and enabling only the selected pointer to perform pointing.

Solution to Problem

In order to solve the above problem, the pointing control device of the present invention is a pointing control device for selecting, from operators who perform a pointing operation of pointing at a position on a screen, a pointer who is allowed to determine a position of a cursor displayed on the screen, the pointing control device comprising: a position acquiring unit configured to, for each operator, acquire a position of a face and acquire a position of a fingertip or a substitute for a fingertip; a distance calculating unit configured to associate, for each operator, the position of the face with the position of the fingertip or the substitute, and to calculate, for each operator, a distance between the position of the face and the associated position of the fingertip or the substitute; a pointer selecting unit configured to select the pointer by using the distance; and a cursor position calculating unit configured to calculate the position of the cursor by using the position of the fingertip or the substitute acquired for the pointer, and to output the position of the cursor.

Advantageous Effects of Invention

The pointing control device of the present invention is capable of selecting, from a plurality of operators, a pointer who determines a pointing position by using the distance between the position of the face and the position of the fingertip or its substitute, and enabling the pointer to perform pointing without being affected by other operators.

DESCRIPTION OF EMBODIMENTS

<Circumstances Leading to the Present Invention>

The conventional method of determining the pointed position by photographing a fingertip is based on the assumption that one fingertip is photographed, and accordingly when two or more fingertips are photographed, it is impossible to select one fingertip for determining a cursor position. That is, when the number of the photographed fingertips is greater than the number of cursors, it is impossible to associate the fingertip with the cursor.

In order to solve this problem, the inventors focused on the fact that the distance between the fingertip and the face of a person differs between the case where he/she is performing a pointing operation and the case where he/she is not performing a pointing operation.

Generally, a person performing a pointing operation extends an arm to put a fingertip close to a screen. As a result, the distance between the face and the fingertip is often large and not constant. In contrast, a person not performing a pointing operation is unlikely to greatly move an arm or extend an elbow. As a result, the distance between the face and the fingertip is often small and constant. Accordingly, the distance between the face and the fingertip can be used to select a person performing a pointing operation from among a plurality of people.

Meanwhile, focusing on one operator, the distance between the fingertip and the face greatly varies when the one operator starts a pointing operation and when the one operator ends a pointing operation. Accordingly, by using the distance between the face and the fingertip, it is possible to detect that an operator starts a pointing operation and that a pointer ends a pointing operation. Therefore, it is possible to exclude, from among targets from which a new pointer is to be selected, a pointer who stops a pointing operation, and it is possible to select, as a new pointer, another operator who starts a pointing operation.

This allows selecting only people performing pointing operations as pointers. In addition, when a pointer changes to another pointer, the previous pointer only has to stop a pointing operation, and the new pointer only has to start a pointing operation. Therefore, a pointer can be easily selected, and changing of pointers is easy.

Embodiment

Embodiments of the present invention are described below with reference to the drawings.

Embodiment 1

Figure 1:
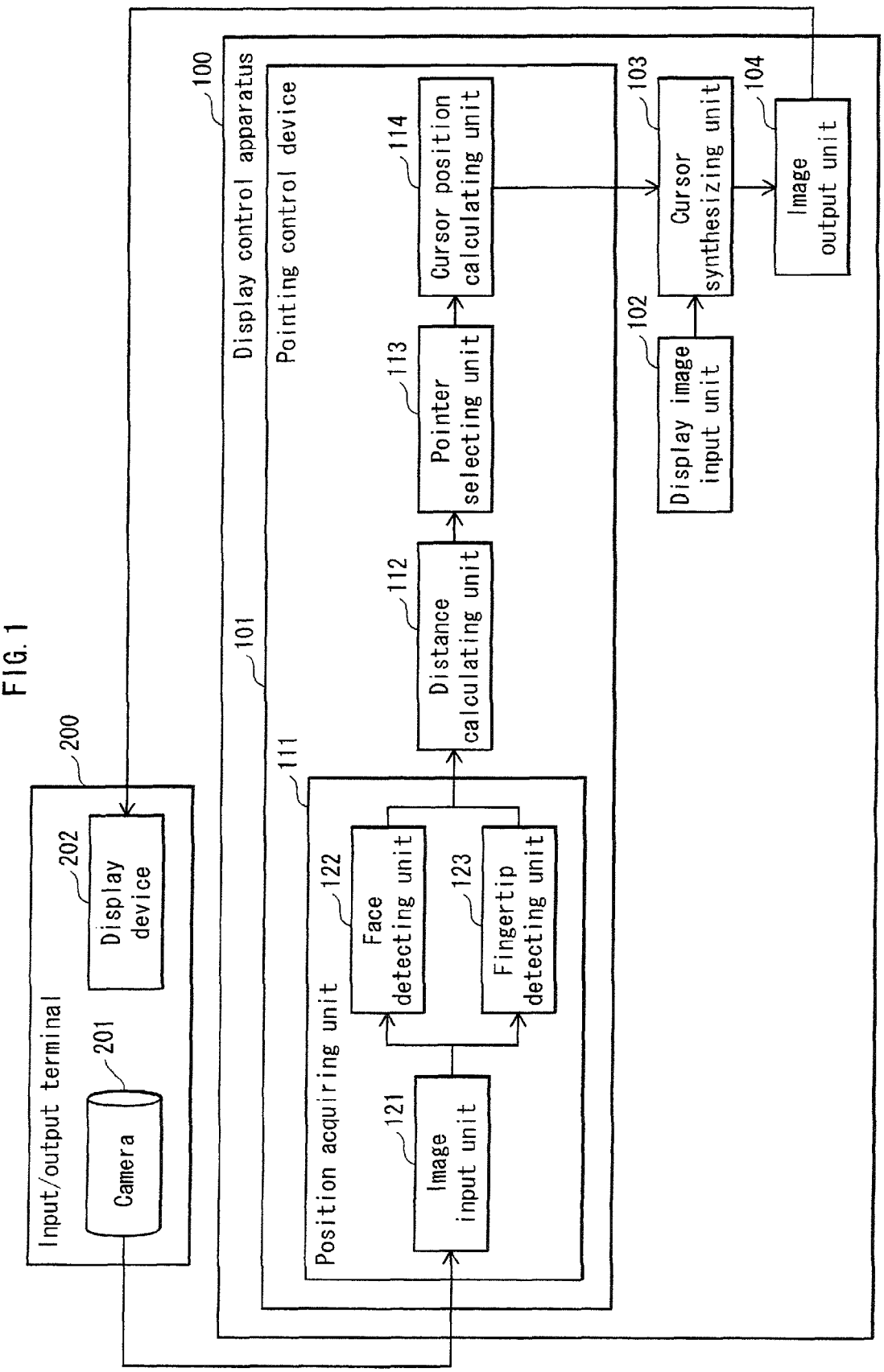
FIG. 1 is a block diagram showing the structure of a display control apparatus equipped with a pointing control device pertaining to Embodiment 1 of the present invention.

FIG. 1 is a block diagram showing the structure of a display control apparatus 100 provided with a pointing control device pertaining to an embodiment of the present invention. The display control apparatus 100 is connected to an input/output terminal 200 and a personal computer (not illustrated) that outputs images to be displayed. The following describes the case where a plurality of operators viewing a screen displayed on one display device perform pointing operations with their fingertips.

<Structure>

In FIG. 1, the display control apparatus 100 includes a pointing control device 101, a display image input unit 102, a cursor synthesizing unit 103, and an image output unit 104. The display control apparatus 100 is realized, for example, by a main apparatus of a TV conference system. The pointing control device 101, the display image input unit 102, the cursor synthesizing unit 103 and the image output unit 104 are realized as part of an integrated circuit. The input/output terminal 200 includes a camera 201 and a display device 202. The display device 202 is realized by a large liquid-crystal display, for example.

The camera 201 photographs an image of an operator performing a pointing operation of pointing at a position on a screen of the display device, and outputs the image to the display control apparatus 100. Note that an image output from the camera 201 includes information for providing the distance between the camera and a subject, as well as information for detecting the subject. The camera 201 is composed of a set of a left camera 201a and a right camera 201b. The camera 201 outputs photographed two images to the display control apparatus 100 as a stereo image. The display control apparatus 100 calculates the distance between the camera and the subject by using parallax between a left image and a right image of the stereo image photographed by the cameras 201a and 201b.

The pointing control device 101 receives the image from the camera 201, and acquires the distance between the face and the fingertip of an operator photographed as a subject. When a plurality of operators are photographed, a pointer for determining a position to be pointed is selected by the acquired distances each of which is between a face and a fingertip. The pointing control device 101 calculates a cursor position to be displayed by using information of the selected pointer, and outputs the position as cursor position information. The pointing control device 101 is composed of a CPU (not illustrated) and a storage unit (not illustrated) of the display control apparatus 100. The storage unit is realized by a nonvolatile memory such as EEPROM, for example. The CPU reads and executes a program stored in the storage unit.

The display image input unit 102 includes an HDMI (High-Definition Multimedia Interface) input port, for example. Via the HDMI input port, the display image input unit 102 acquires, from the personal computer, information to be displayed on a screen as a display image.

The cursor synthesizing unit 103 receives the cursor position information from the pointing control device 101, and superimposes the cursor on the image acquired by the display image input unit 102 to generate a synthesized display image. Further, until receiving the cursor position information from the pointing control device 101, the cursor synthesizing unit 103 uses a predetermined cursor position as cursor position information to synthesize the cursor. The predetermined cursor position is positioned at an upper left corner of the display image.

The image output unit 104 receives the synthesized display image generated by the cursor synthesizing unit 103 and outputs the synthesized display image into the display device 202. The display device 202 displays the synthesized display image on the screen.

The pointing control device 101 includes a position acquiring unit 111, a distance calculating unit 112, a pointer selecting unit 113 and a cursor position calculating unit 114.

The position acquiring unit 111 receives an image from the camera 201, detects a position of a face and a position of a fingertip for an operator photographed as a subject, and outputs the detected position information to the distance calculating unit 112. The position acquiring unit 111 includes an image input unit 121, a face detecting unit 122, and a fingertip detecting unit 123.

The image input unit 121 receives an image from the camera 201, and outputs the image to the face detecting unit 122 and the fingertip detecting unit 123.

The face detecting unit 122 detects, from the image received from the image input unit 121, a face of an operator photographed as a subject, and outputs position information. When any face appears in the image, the face detecting unit 122 detects all the faces as faces of operators. The face detecting unit 122 outputs position information of each detected face to the distance calculating unit 112. The position information includes three pieces of information, i.e., the distance from the camera, a horizontal position, and a vertical position.

The fingertip detecting unit 123 detects, from the image received from the image input unit 121, a fingertip of an operator photographed as a subject, and outputs position information. When any fingertip appears in the image, the fingertip detecting unit 123 detects all the fingertips as fingertips of operators. The fingertip detecting unit 123 outputs position information of each detected fingertip to the distance calculating unit 112. The position information includes three pieces of information, i.e., the distance from the camera, a horizontal position, and a vertical position.

The distance calculating unit 112 associates, for each operator, a face with a fingertip based on the positions of face and fingertip output by the position acquiring unit 111, and calculates the distance between the associated face and fingertip. When a plurality of operators appear in the image as subjects, the position acquiring unit 111 outputs a plurality of pieces of face position information as described above. For each of the plurality of faces output by the position acquiring unit 111, the distance calculating unit 112 selects a corresponding fingertip, and calculates the distance between the face and the finger for each operator.

The pointer selecting unit 113 selects a pointer by using the distance between the face and the fingertip calculated by the distance calculating unit 112. The pointer has authority to move the cursor so as to determine a position to be pointed. The pointer selecting unit 113 outputs position information of a face and a fingertip of the selected pointer, and the distance between the face and the fingertip of the pointer. A pointer is the only operator that has authority to move the cursor. In the present embodiment, when a plurality of operators appear in the image as subjects, the pointer selecting unit 113 selects an operator having the largest distance between the face and the fingertip as a pointer. When the distance calculating unit 112 calculates the distance between the face and the fingertip for only one operator, the pointer selecting unit 113 selects the operator as a pointer. When the distance calculating unit 112 does not calculate the distance for any operator, the pointer selecting unit 113 determines that there is no pointer.

Based on the position information and the distance received from the pointer selecting unit 113, which is information on the pointer, the cursor position calculating unit 114 calculates a position of the cursor to be displayed, and outputs the calculated position as cursor position information. The cursor position calculating unit 114 stores therein a position of the cursor that is displayed and position information of a face and a fingertip of a pointer determining the position of the cursor. The cursor position calculating unit 114 judges whether a pointer has changed based on newly received position information on a face and a fingertip of a pointer. When a pointer has changed, the cursor position calculating unit 114 outputs the initial cursor position as current cursor position information. The initial cursor position is the center of the image. When a pointer has not changed, the cursor position calculating unit 114 calculates a cursor position by a calculating method described later and outputs the calculated position as current cursor position information.

Figure 2:
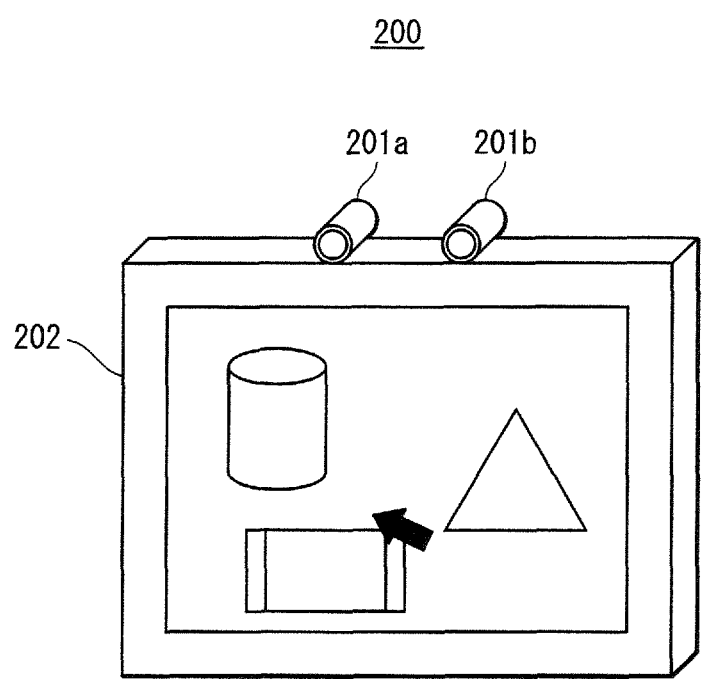
FIG. 2 illustrates an external appearance of an input/output terminal connected to the display control apparatus pertaining to Embodiment 1 of the present invention.

FIG. 2 illustrates an external appearance of the input/output terminal 200 connected to the display control apparatus 100 pertaining to the present embodiment. The input/output terminal 200 is composed of one display device 202 for displaying a screen, and a set of cameras for photography. The camera 201 is composed of a set of the left camera 201*a* and the right camera 201*b*. The camera 201 outputs a stereo image.

In FIG. 2, the camera 201 is placed on the display device 202. When the camera 201 and the display device 202 are closely placed and face in the same direction, this offers convenience that, when an operator viewing a screen on the display device 202 performs a pointing operation, a face and a fingertip of the operator are likely to be in a viewing angle of the camera 201.

<Operation>

Figure 3:
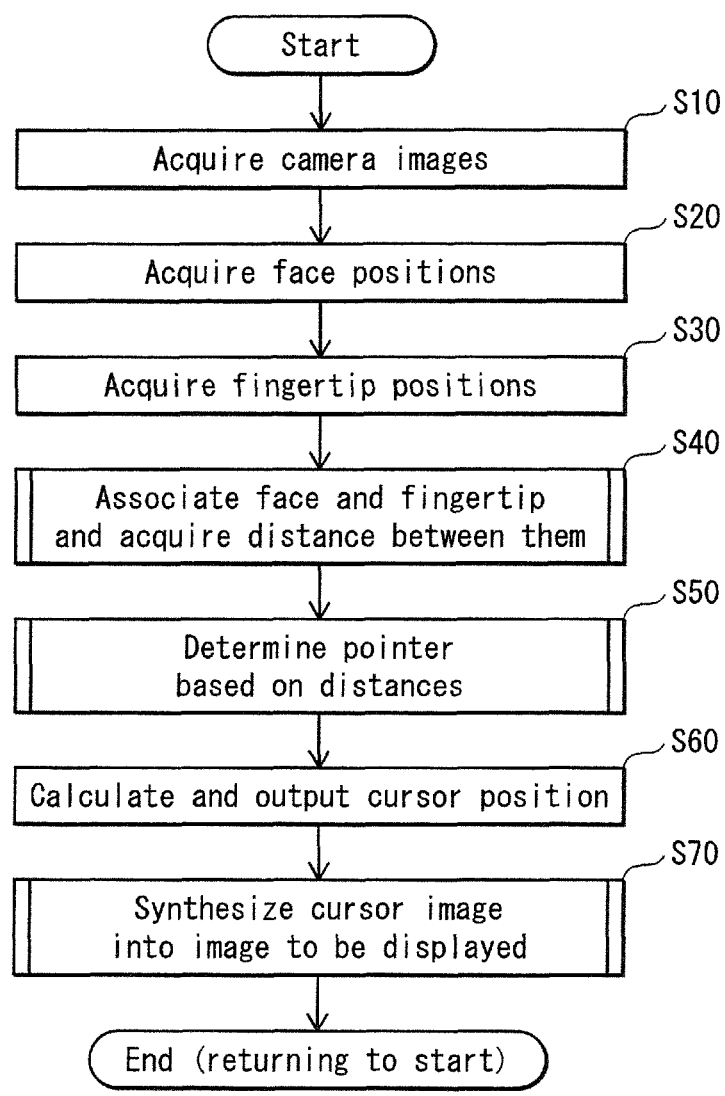
FIG. 3 is a flowchart showing operations of the pointing control device pertaining to Embodiment 1 of the present invention.

FIG. 3 is a flowchart showing operations of the display control apparatus 100 including the pointing control device 101 pertaining to present embodiment.

The display control apparatus 100 acquires an image photographed by the camera 201 (S10). The position acquiring unit 111 activates the face detecting unit 122 and the fingertip detecting unit 123.

Next, the face detecting unit 122 analyzes the image acquired by the image input unit 121, detects all the faces appearing in the image, and outputs position information of each face to the distance calculating unit 112 (S20).

Similarly, the fingertip detecting unit 123 analyzes the image acquired by the image input unit 121, detects all the fingertips appearing in the image, and outputs position information of each fingertip to the distance calculating unit 112 (S30).

Here, description is made on a method of acquiring position information of a face and a fingertip. First, an area corresponding to a face or a fingertip is detected by facial recognition using an outer frame (outline), components, or color of skin. Then a feature point closest to the camera 201 is extracted from the detected area. When a face is detected, an outer frame (outline) of the face is generally detected. As a result, a point that falls within the outer frame of the face and is closest to the camera 201 is extracted as a feature point. In this case, a feature point is generally a tip of a nose. In the following explanation, a position of a tip of a nose is treated as a face position. Similarly, when a fingertip is detected, a contour thereof is generally detected, and a point closest to the camera is extracted as a feature point. In this case, a feature point is generally a tip of an index finger. In the following explanation, a position of a tip of an index finger is treated as a fingertip position.

Next, a position of a feature point is acquired. Although the following describes a method for acquiring a fingertip position, a face position is acquired by the same method.

Figure 4:
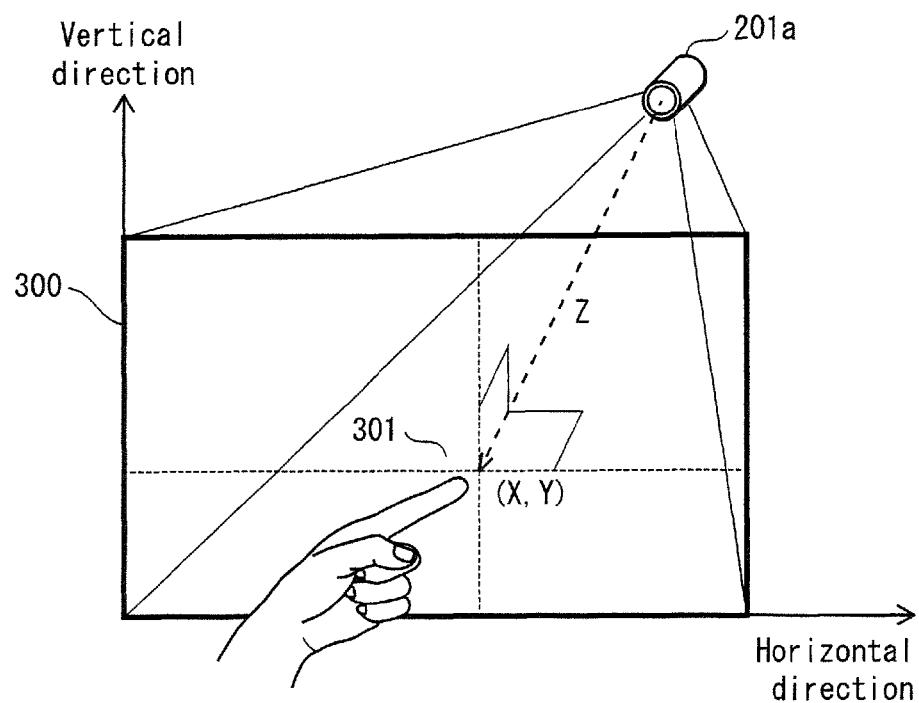
FIG. 4 shows a positional relationship between a detected fingertip and a camera pertaining to Embodiment 1 of the present invention.

FIG. 4 shows a positional relationship between the camera 201a and a fingertip. A position 301 indicates a fingertip position. Further, a frame 300 shows a field of view of the camera 201a at the position where the distance to the camera is the distance between the fingertip 301 and the camera 201a.

First, based on the images photographed by the camera 201a and the camera 201b, parallax at the fingertip 301 is detected to calculate a distance Z between the camera and the fingertip. Subsequently, a plain on which a vector extending from the fingertip 301 to the camera 201a is a normal vector is acquired, and the frame 300 of the field of view of the camera is obtained by projecting the field of view on the plain. The sizes, i.e., lengths in the vertical and horizontal directions of the frame 300 of the field of view are determined by the viewing angle of the camera and the distance Z. In the present embodiment, a fingertip position (X, Y, Z) is acquired by using the horizontal position X and the vertical position Y of the frame 300 of the field of view. That is, X and Y are relative values dependent on the size of the frame 300 of the field of view. The lower left corner of the frame 300 of the field of view is set as the origin (0, 0), and the upper right corner is set as (200, 150).

Subsequently, the distance calculating unit 112 associates a face and a fingertip, and calculates the distance between the associated face and fingertip (S40).

Figure 5:
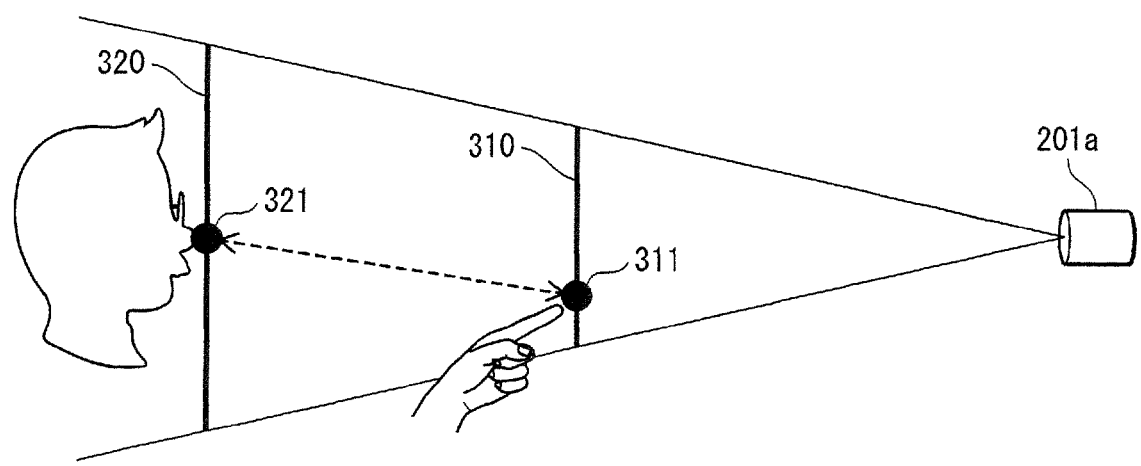
FIG. 5 shows one example of a positional relationship among the camera, a fingertip of a subject, and a face of the subject, pertaining to Embodiment 1 of the present invention.

FIG. 5 shows a positional relationship among the camera 201a, a fingertip and a face of a subject, which are viewed from the side. A position 311 indicates a fingertip position, and a position 321 indicates a face position. A line 310 indicates a frame of a field of view of the camera at the position 311 indicating the fingertip position. A line 320 indicates a frame of a field of view of the camera at the face position 321. Note that the frames 310 and 320 of the two fields of view of the camera are represented as straight lines when viewed from the side.

Figure 6:
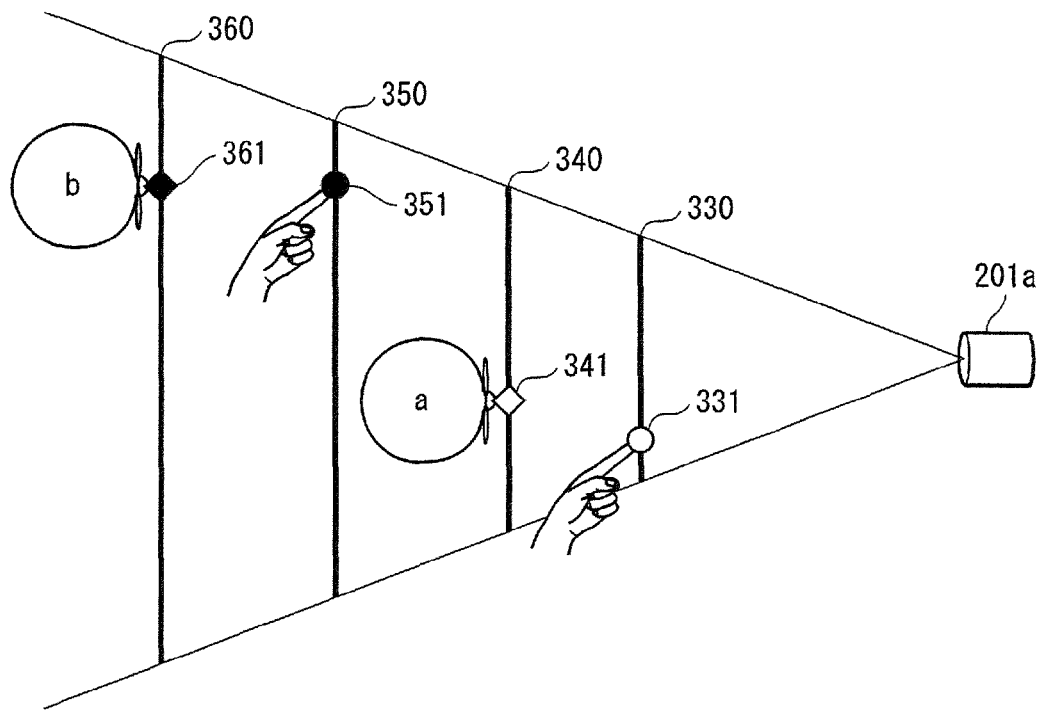
FIG. 6 shows one example of a positional relationship among a camera, fingertips and faces of a plurality of subjects, pertaining to Embodiment 1 of the present invention.
Figure 7:
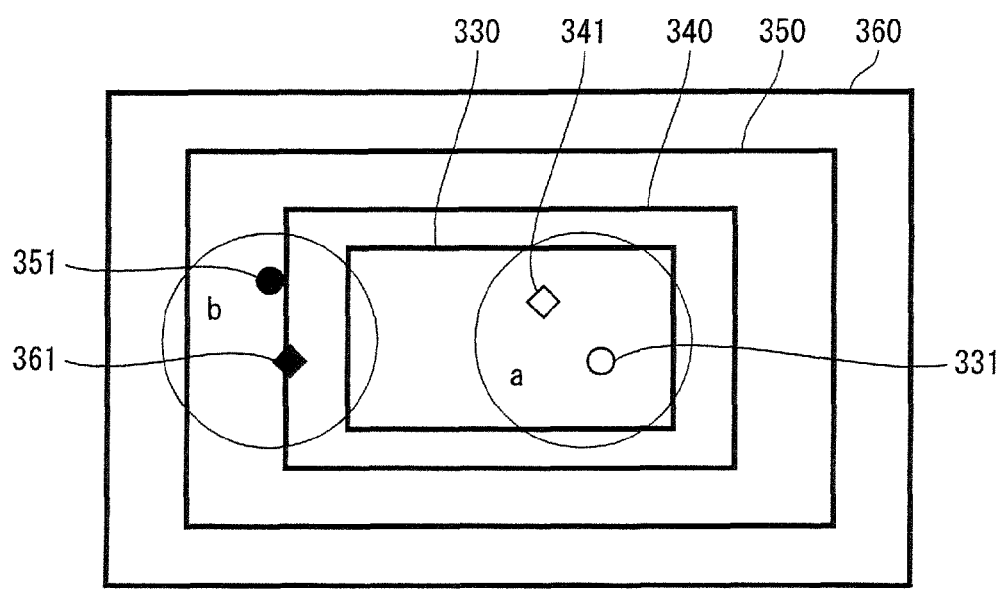
FIG. 7 shows one example of frames of field of view of a camera viewed from the front of the camera, the face positions, and the fingertip positions, pertaining to Embodiment 1 of the present invention.

FIG. 6 shows a positional relationship among the camera 201a, fingertips and faces of a plurality of subjects, which are viewed from the side. A position 331 indicates a fingertip position of a subject a, and a position 341 indicates a face position of the subject a. A position 351 indicates a fingertip position of a subject b, and a position 361 indicates a face position of the subject b. Each of lines 330, 340, 350 and 360 indicates a frame of a field of view of the camera at the fingertip position 331 of the subject a, at the face position 341 of the subject a, at the fingertip position 351 of the subject b, or the face position 361 of the subject b. In FIG. 6, the subject a and the subject b are detected, and the subject a is located closer to the camera than the subject b is. FIG. 7 shows the positional relationship shown in FIG. 6, which is viewed from a point on the optical axis of the camera 201a.

Figure 8:
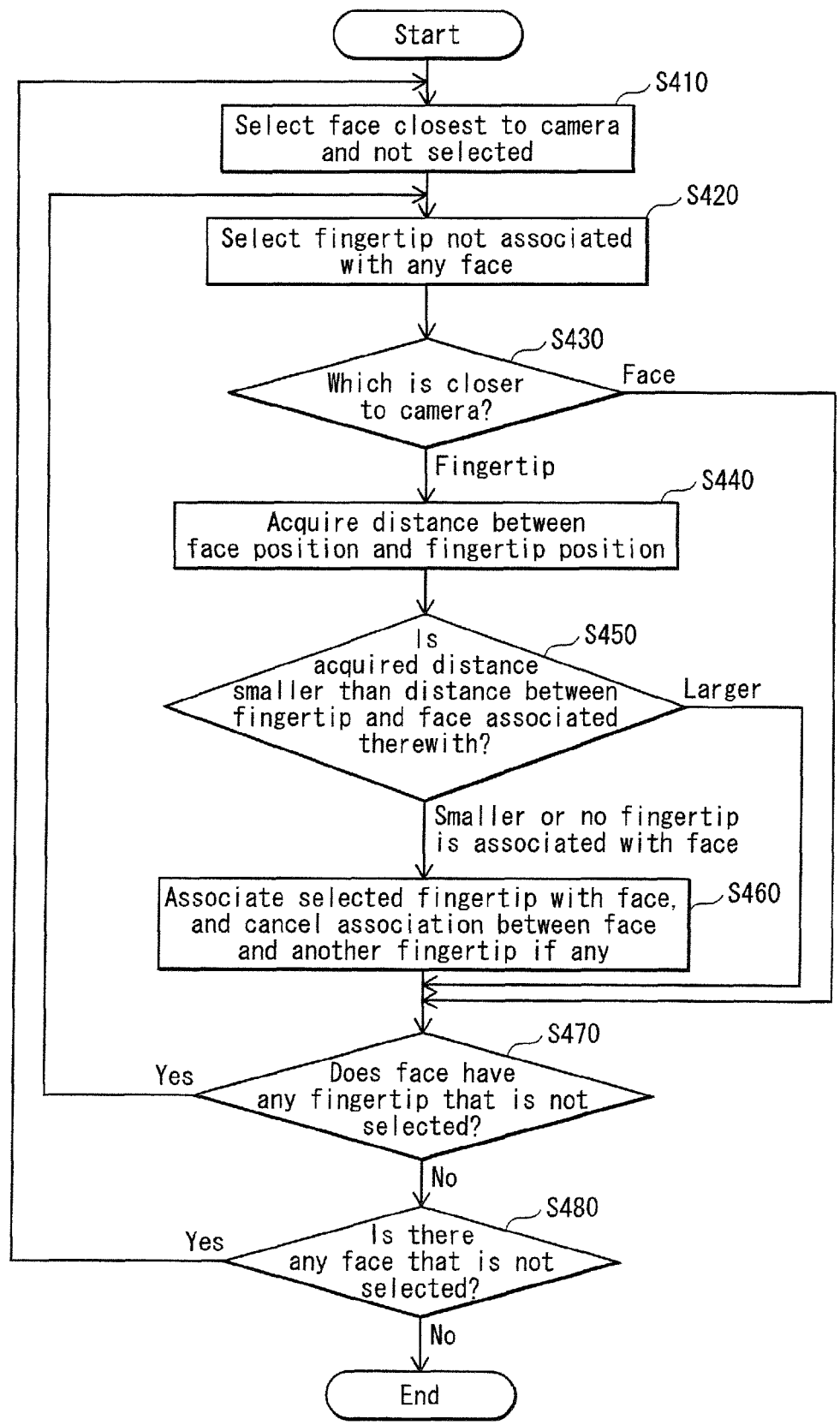
FIG. 8 is a flowchart showing one example of operations of a distance calculating unit pertaining to Embodiment 1 of the present invention.

FIG. 8 is a flowchart showing operations of the distance calculating unit 112. By using FIG. 8, description is made on operations performed by the distance calculating unit 112 of associating, for each operator, a face with a fingertip based on the positions of the face and the fingertip, and acquiring the distance between the face and the fingertip.

Note that in the present embodiment, the distance calculating unit 112 associates a face with a fingertip so as to satisfy two conditions 1 and 2. The condition 1 is that a fingertip position is closer to the camera than a face position is. The condition 2 is that a face and a fingertip whose distance therebetween is smallest are associated.

The distance calculating unit 112 selects one of the face positions received from the position acquiring unit 111 that has not been selected and is closest to the camera 201a (S410).

Subsequently, the distance calculating unit 112 selects one of the fingertip positions that is received from the position acquiring unit 111 and has not been associated with any face (S420).

Subsequently, the distance calculating unit 112 pairs the selected face position and fingertip position, and judges which of them is closer to the camera 201a (S430).

When the fingertip position is closer to the camera 201a (S430), the distance calculating unit 112 acquires the distance between the paired face position and fingertip position (S440). Further, if the distance calculating unit 112 does not store therein the distance between the face and the fingertip regarding the selected face position (S450), the distance calculating unit 112 stores therein the acquired distance, and associates the selected face position with the selected fingertip position (S460). Further, if the distance calculating unit 112 stores therein the distance between the face and the fingertip regarding the selected face position, the distance calculating unit 112 compares the stored distance and the newly acquired distance (S450). When the new distance is smaller, the distance calculating unit 112 cancels the stored distance and the association regarding the selected face position, and stores therein the new distance and associates the selected fingertip position with the selected face position (S460).

In contrast, when the face position is closer to the camera 201a (S430), the distance calculating unit 112 determines that such a pair does not satisfy the conditions for association.

Subsequently, when there is a fingertip position that has not been selected regarding the selected face position (Yes in S470), processing returns to step S420 and judgment as to whether a pair of the face position with a newly selected fingertip position satisfies the conditions is repeated.

In contrast, when all the fingertip positions have been selected regarding the selected face position (No in S470), the distance calculating unit 112 judges whether there is any face position that has not been selected (S480). When there is a face position that has not been selected, processing returns to step S410 and the face position is newly selected, and judgment as to whether a pair of the face position with a fingertip position satisfies the conditions is repeated.

When all the face positions have been selected (No in S480), the distance calculating unit 112 completes processing for association.

As described above, when a plurality of operators appear in the image as subjects, the distance calculating unit 112 selects each face position, and successively associates each face position with the most appropriate fingertip position. Thus, the distance calculating unit 112 can associate a faces with a fingertip for each operator appearing in the image as a subject, and acquire the distance between the face and the fingertip for each operator.

The following describes a specific example in which the distance calculating unit 112 associates a face with a fingertip for each of a plurality of operators, with reference to FIGS. 6 and 7.

In order to establish associations among the detected face positions 341 and 361 and the fingertip positions 331 and 351, the distance calculating unit 112 sequentially pairs each face position with a fingertip position that is most appropriately located.

First, the distance calculating unit 112 selects the face position 341 that is a face position closest to the camera (S410).

Subsequently, the distance calculating unit 112 selects the fingertip position 331 (S420). Subsequently, the distance calculating unit 112 determines which of the face position 341 and the fingertip position 331 is closer to the camera 201*a* (S430). Since the fingertip position 331 is closer to the camera, the distance calculating unit 112 acquires the distance between the face position 341 and the fingertip position 331 (S440). Since no fingertip is associated with the face position 341 (S450), the distance calculating unit 112 associates the face position 341 with the fingertip position 331 and stores the distance (S460).

Subsequently, the fingertip position 351 has not been selected for the face position 341 (Yes in S470), the distance calculating unit 112 selects the fingertip position 351 (S420). Subsequently, the distance calculating unit 112 judges which of the face position 341 and the fingertip position 351 is closer to the camera 201*a* (S430). Since the face position 341 is closer to the camera, the distance calculating unit 112 determines whether there is any fingertip that has not been selected for the face position 341 (S470). Since there is no fingertip that has not been selected, the distance calculating unit 112 judges whether there is any face that has not been selected (S480). The distance calculating unit 112 selects the fingertip position 361 that has not been selected (S410).

Subsequently, the distance calculating unit 112 selects the fingertip position 351 (S420). Subsequently, the distance calculating unit 112 judges which of the face position 361 and the fingertip position 351 is closer to the camera 201*a* (S430). Since the fingertip position 351 is closer to the camera, the distance calculating unit 112 acquires the distance between the face position 361 and the fingertip position 351 (S440). Since no fingertip is associated with the face position 361 (S450), the distance calculating unit 112 associates the face position 361 with the fingertip position 351 and stores the distance (S460).

Subsequently, the distance calculating unit 112 judges whether there is any fingertip that has not been selected for the face position 361 (S470). Since the fingertip position 331 has been already associated with the face position 341 and cannot be selected, the distance calculating unit 112 judges whether there is any face that has not been selected (S480). Since there is no face position that has not been selected, the distance calculating unit 112 ends processing.

As described above, the face position 341 and the fingertip position 331 are associated with each other and the distance therebetween is calculated, and the face position 361 and the fingertip position 351 are associated with each other and the distance therebetween is calculated.

Subsequently, the pointer selecting unit 113 selects a pointer based on each distance between the face and the fingertip (S50).

Figure 9:
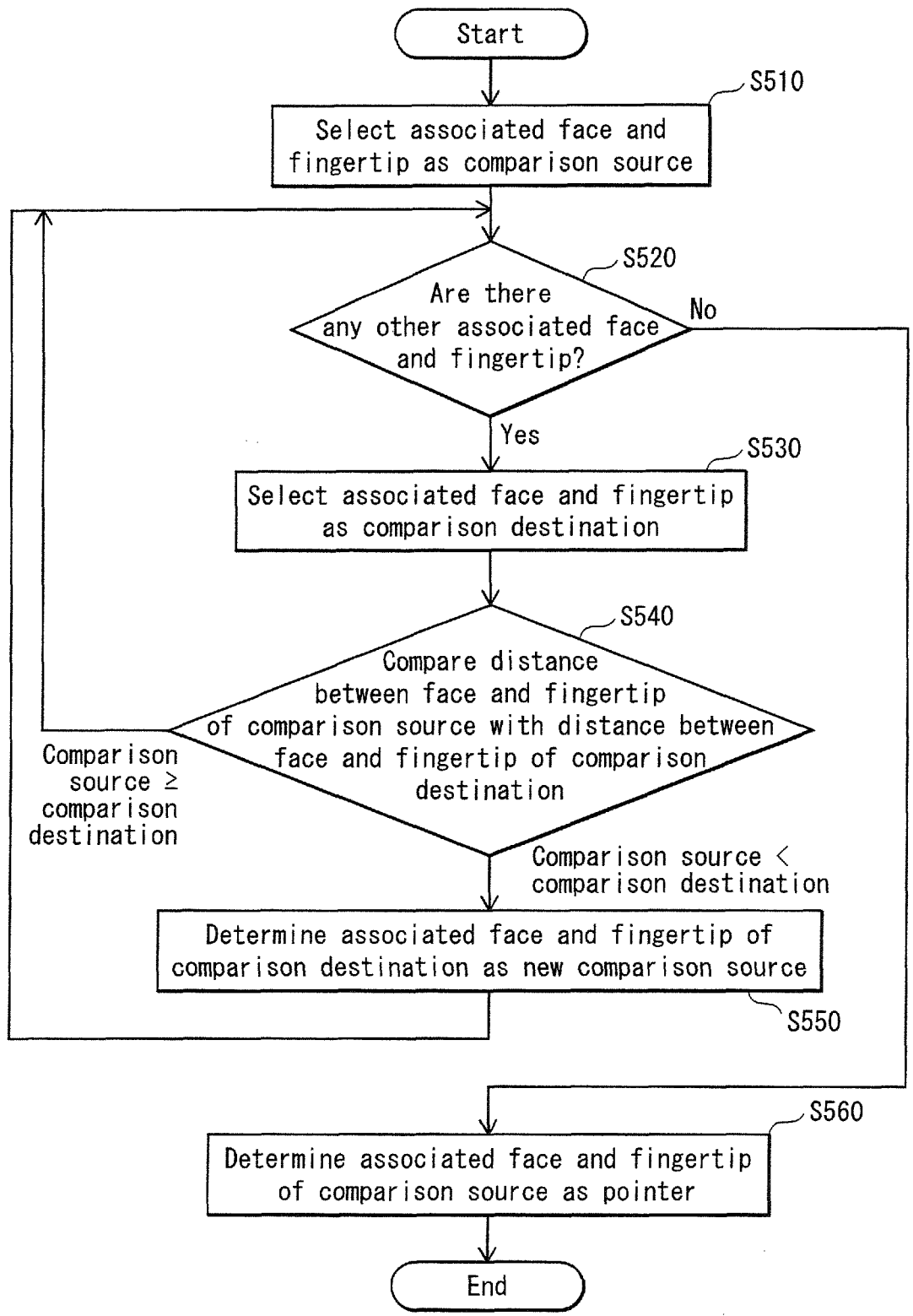
FIG. 9 is a flowchart showing one example of operations of a pointer selecting unit pertaining to Embodiment 1 of the present invention.

FIG. 9 is a flowchart showing operations of the pointer selecting unit 113. With reference to FIG. 9, description is made on operations of the pointer selecting unit 113 for selecting a pointer.

The pointer selecting unit 113 selects one of the associations (hereinafter, referred to as pairs) established by the distance calculating unit 112 between faces and fingertips. The selected pair is a comparison source pair (S510).

Subsequently, the pointer selecting unit 113 judges whether there is any other pair associated by the distance calculating unit 112 (Yes in S520). When there are some other pairs, one of them is selected (S530). The selected pair is a comparison destination pair.

The pointer selecting unit 113 judges which of the comparison source pair and the comparison destination pair has a greater distance between the face and the fingertip (S540). When the comparison destination pair has the greater distance, the pointer selecting unit 113 selects the comparison destination pair as a new comparison source pair (S550).

Subsequently, the pointer selecting unit 113 judges whether there is any other pair associated by the distance calculating unit 112 (S520). When there is any other pair, the pointer selecting unit 113 repeats processing of selecting one pair as a comparison destination pair.

In contrast, when all the pairs associated by the distance calculating unit 112 have been selected more than once as a comparison source pair or a comparison destination pair (No in S520), the pointer selecting unit 113 determines that the comparison source pair has the greatest distance between the face and the fingertip, and selects the pair as a pointer (S560).

Subsequently, the cursor position calculating unit 114 calculates a cursor position based on information of the selected pointer, and outputs the cursor position (S60).

The cursor position calculating unit 114 receives information on one pointer from the pointer selecting unit 113. The cursor position calculating unit 114 stores therein a position of the cursor that is displayed and information of a pointer who has determined the position (information on a face position, and information on a fingertip position). Based on newly received information on a pointer, the cursor position calculating unit 114 judges whether a pointer has changed, and then calculates a cursor position. This is because a calculating method of a cursor position differs according to whether a new pointer is the same as the immediately previous pointer.

The cursor position calculating unit 114 judges whether a pointer has changed based on whether a face position of a pointer has greatly changed.

The pointing control device 101 pertaining to the present embodiment is based on the assumption that an operator performs a pointing operation without moving from his/her seat. Accordingly, the cursor position calculating unit 114 uses ½ of the distance between the center of a seat and the center of an adjacent seat as a threshold value, and when the distance between a face position of the immediately previous pointer and a face position of the current pointer exceeds the threshold value, the cursor position calculating unit 114 judges that the pointer has changed. Otherwise, the previous pointer and the current pointer are assumed to sit at the same seats, and accordingly it is judged that the pointer has not changed.

When a pointer has changed, the cursor position calculating unit 114 outputs, as current cursor position information, the initial cursor position that is stored beforehand. The initial cursor position is, as described above, the center of the image.

When a pointer has not changed, the cursor position calculating unit 114 outputs a position of an intersection of a straight line running from a fingertip to the display device and a display surface of the display device as a current cursor position.

According to operations from S10 to S60, the pointing control device 101 outputs a cursor position based on the image received from the camera 201.

Next, description is made on operations of the display control apparatus 100 for outputting an instruction.

The display image input unit 102 receives an image to be displayed on the display device 202 from the personal computer, and the cursor synthesizing unit 103 perform synthesis by superimposing the cursor into the image received from the display image input unit 102 at a cursor position output by the pointing control device to output the synthesized image (S70).

Figure 10:
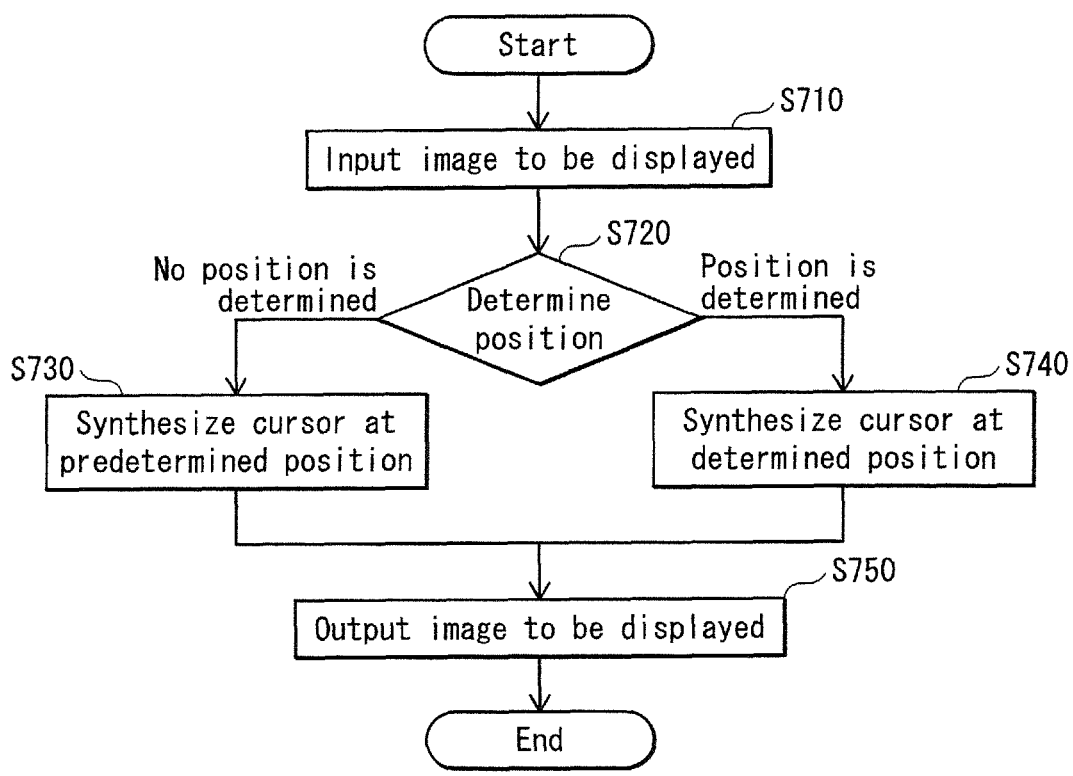
FIG. 10 is a flowchart showing one example of operations of a cursor synthesizing unit pertaining to Embodiment 1 of the present invention.

FIG. 10 is a flowchart showing operations of the cursor synthesizing unit 103.

The cursor synthesizing unit 103 receives a display image from the display image input unit 102 (S710). Such a display image is data of an original image for display.

Subsequently, the cursor synthesizing unit 103 judges whether a cursor position is determined by the pointing control device 101 (S720).

When no cursor position is determined (S720), the cursor synthesizing unit 103 synthesizes the cursor at the predetermined cursor position into an image to be displayed so as to generate a synthesized display image (S730). Here, the predetermined cursor position is positioned at an upper left corner of the display image, as described above.

When a cursor position is determined (S720), the cursor synthesizing unit 103 synthesizes a cursor into the image to be displayed at a position determined by the cursor position information to generate a synthesized display image (S740).

Finally, the cursor synthesizing unit 103 outputs the generated synthesized display image to the image output unit 104 (S750).

Figure 11A:
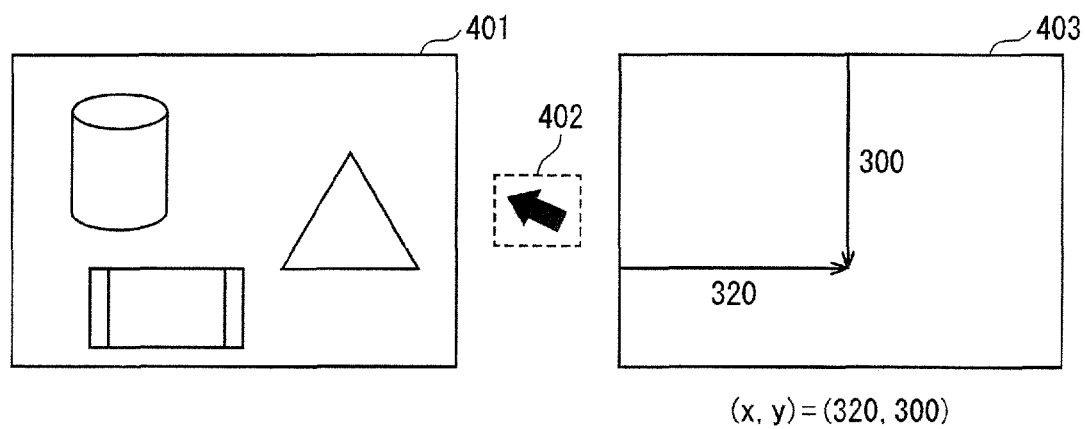
FIGS. 11A and 11B show an example of a synthesized display image generated by the cursor synthesizing unit pertaining to Embodiment 1 of the present invention.
Figure 11B:
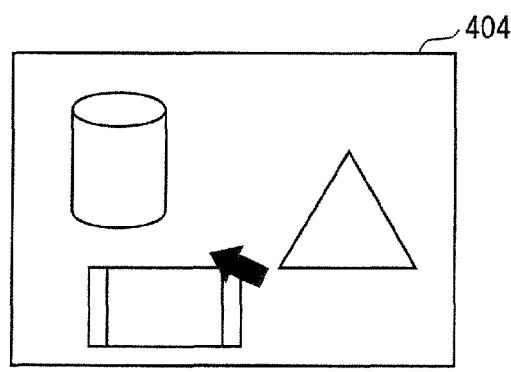

FIGS. 11A and 11B show an example of a synthesized display image generated by the cursor synthesizing unit 103. FIG. 11A shows a display image 401 that is received from the display image input unit 102 by the cursor synthesizing unit 103, and image data 402 of the cursor. A schematic image 403 shows a determined position indicated by the cursor position information received from the pointing control device 101 by the cursor synthesizing unit 103.

FIG. 11B shows a synthesized display image 404 generated by using information shown in FIG. 11A. The cursor synthesizing unit 103 superimposes the cursor image data 402 at a specified position in the schematic image 403 indicated by the cursor position information in the display image 401 received from the display image input unit 102, and generates the synthesized display image 404.

<Summary>

As described above, the display control apparatus equipped with the pointing control device can select a pointer who determines a position to be pointed from among a plurality of operators, and display the cursor at a position determined by the selected pointer.

When a plurality of operators perform pointing operations, the pointing control device selects a pointer that has authority to move the cursor from among the plurality of operators by using the distance of the face and the fingertip of each operator appearing in the image as a subject.

An operator can take over authority to move the cursor from a pointer currently performing a pointing operation by extending his/her arm toward a camera. The operator's movement of extending his/her arm toward a camera farther than the pointer is less likely to impede the progress of a conference compared with a movement of moving to an operator area, and accordingly efficiency of progress of a conference is improved. Especially, in a physically small room, the pointing control device makes it unnecessary for operators to change seats, which is difficult, and therefore this is effective.

Further, selecting a pointer is based on the distance between the face and the fingertip for an operator, and does not depend on the distance between a camera and the operator. Accordingly, even when other attendees are closer to the camera than the operator is, the operator can take over authority to move the cursor from the current pointer by extending his/her arm toward the camera as a new pointer.

Further, when a pointer having authority to move the cursor has changed, the pointing control device moves the cursor to the initial position, e.g., the center of the screen, which enables a new pointer to start moving the cursor regardless of a position at which an immediately previous pointer pointed.

(Modification 1)

The cursor position calculating unit 114 pertaining to Embodiment 1 determines the position of the intersection of the straight line running from a fingertip to the display device and a screen of the display device as a cursor position. However, when a screen of the display device is too large compared with a range within which a fingertip is movable, there might be a range in which a pointer cannot perform a pointing operation. If a mouse is used, for example, to move the cursor in such a case and the cursor comes to the edge of a plain on which the mouse can be moved, the mouse can be moved again in the same direction by lifting and returning the mouse once. However, the pointing control device pertaining to Embodiment 1 cannot distinguish a movement of a fingertip for moving the cursor from a movement of a fingertip for not moving the cursor, and therefore cannot extend a range within which the cursor is movable.

There is a cursor position calculating method for determining a position to which the cursor is moved in a direction in which a fingertip has been moved as a new cursor position. In this case, it is necessary to determine the distance the cursor moves. Normally, the distance the cursor moves is determined by using the distance a fingertip moved. However, when the distance the cursor moves is determined as a multiple of a certain constant of the distance the fingertip moves and the constant is small, there might be a range in which the cursor is not movable. In contrast, when the constant is large, a slight move of a fingertip greatly moves the cursor and it is difficult to subtly move the cursor. Accordingly, the cursor might not be properly positioned.

In the present modification, the cursor position calculating unit 114 determines the distance the cursor moves by using the distance between the face and the finger of a pointer. This allows a pointer to properly move the cursor by using two pointing operations: pointing performed when the distance between the face and the fingertip is small; and pointing performed when the distance between the face and the fingertip is large.

The pointing control device pertaining to the present modification except a method for calculating a cursor position is the same as in Embodiment 1. Therefore, the same elements and operations as those in Embodiment 1 are omitted from the following description, and only the method for calculating a cursor position is explained.

Figure 12A:
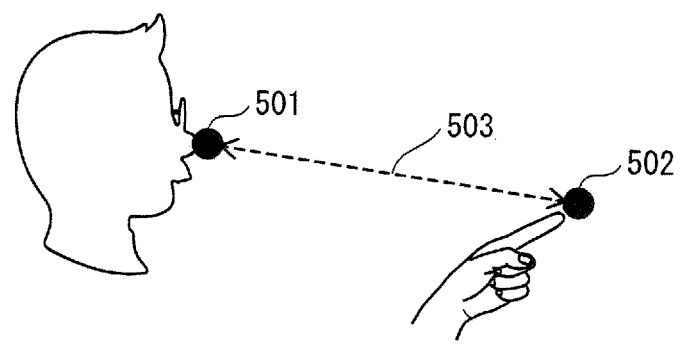
FIG. 12A shows a large distance between a face and a fingertip and FIG. 12B shows a small distance between a face and a fingertip pertaining to Modification 1 of Embodiment 1 of the present invention.
Figure 12B:
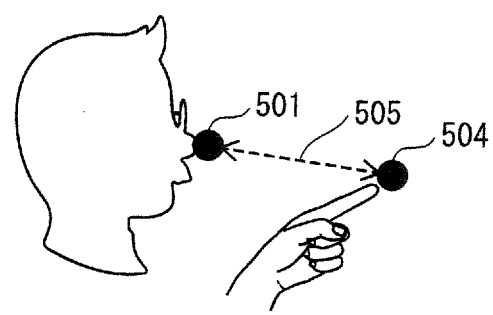

FIGS. 12A and 12B show large and small distances between faces and fingertips.

FIG. 12A illustrates the case where the distance between the face and the fingertip is large. FIG. 12B illustrates the case where the distance between the face and the fingertip is small.

In FIGS. 12A and 12B, each position 501 indicates a face position. In FIG. 12A showing the case where the distance between the face and the fingertip is large, a position 502 indicates a fingertip position, and a distance 503 is the distance between the face position 501 and the fingertip position 502. In FIG. 12B showing the case where the distance between the face and the fingertip is small, a position 504 indicates a fingertip position, and a distance 505 is the distance between the face position 501 and the fingertip position 504.

Figure 13:
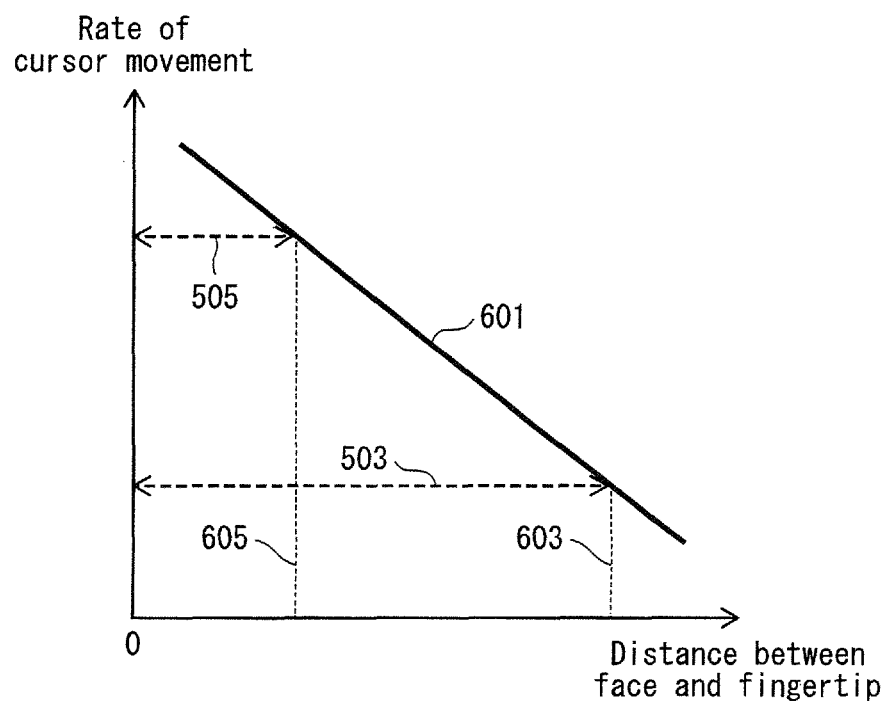
FIG. 13 shows one example of correspondence between a distance between a face and a fingertip and a rate of cursor movement, pertaining to Modification 1 of Embodiment 1 of the present invention.

FIG. 13 shows one example of correspondence between the distance between the face and the fingertip and a rate of cursor movement.

In FIG. 13, the horizontal axis indicates the distance between the face and the fingertip and the vertical axis indicates a rate of cursor movement. A graph 601 shows correspondence between the distance between the face and the fingertip and the rate of cursor movement. The rate of cursor movement corresponding to the graph 601 is set according to a given distance between the face and the fingertip. For example, when a broken line segment 503 indicates the distance between the face and the fingertip, the rate of cursor movement is indicated by a dotted line segment 603. When a broken line segment 505 indicates the distance between the face and the fingertip, the rate of cursor movement is indicated by a dotted line segment 605.

As shown in FIG. 13, according to the present embodiment, the rate of cursor movement is set to increase as the distance between the face and the fingertip decreases. Therefore, when a pointer wishes to greatly move the cursor, the pointer only has to bring his/her fingertip to his/her face. Further, increasing the distance between his/her fingertip and his/her face enables a pointer to subtly move the cursor.

The cursor position calculating unit 114 multiplies the rate of cursor movement shown in FIG. 13 by the moving distance of a fingertip so as to calculate the distance the cursor moves (the distance the cursor moves=the rate of cursor movement× the distance the fingertip moves).

As described above, when a pointer moves his/her fingertip, the cursor position calculating unit 114 calculates the direction and the distance of his/her fingertip, and outputs, as current cursor position information, a position to which the cursor moves by the calculated direction in the calculated direction from a position of the cursor that is displayed.

<Summary>

As described above, the pointing control device pertaining to the present modification enables a pointer to control the distance the cursor moves by changing the distance between the face and the fingertip. This enables the pointer to change the distance the cursor moves without changing the distance the fingertip moves, and to control the cursor with more precision. Further, when the pointer can move his/her fingertip only within a small area, it is possible, by controlling the distance between the face and the fingertip to increase the rate of cursor movement, to prevent a problem that there might be a range in which the cursor is not movable.

Embodiment 2

A display control apparatus equipped with a pointing control device pertaining to the present embodiment enables a plurality of cursors to be displayed at the same time, and enables a plurality of pointers to operate their respective Cursors.

The display control apparatus pertaining to the present modification is the same as in Embodiment 1 except operations of a pointer selecting unit, a cursor position calculating unit and a cursor synthesizing unit. Therefore, the same elements and operations as those in Embodiment 1 are omitted from the following description, and only the difference is explained.

A display control apparatus 150 pertaining to the present modification has a pointing control device 151 and a cursor synthesizing unit 153 instead of the pointing control device 101 and the cursor synthesizing unit 103, respectively. Further, the pointing control device 151 includes a pointer selecting unit 163 and a cursor position calculating unit 164 instead of the pointer selecting unit 113 and the cursor position calculating unit 114, respectively.

Note that the pointer selecting unit 163 has the same functions as those of the pointer selecting unit 113 except selecting a plurality of pointers. Further, the cursor position calculating unit 164 has the same functions as those of the cursor position calculating unit 114 except receiving information on the plurality of pointers and outputting a plurality of cursor positions. At the same time, the cursor synthesizing unit 153 has the same functions as those of the cursor synthesizing unit 103 except receiving the plurality of cursor positions and synthesizing a plurality of Cursors.

Figure 14:
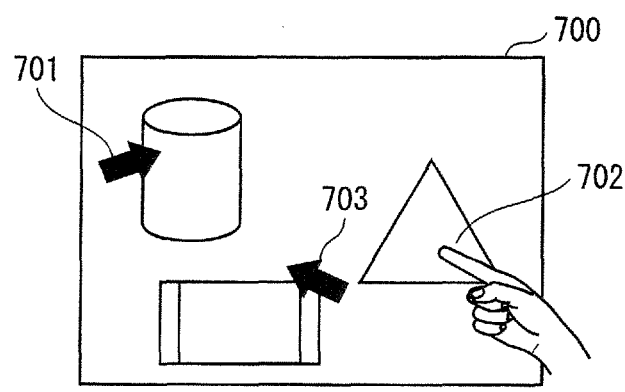
FIG. 14 shows one example of a synthesized display image generated by a cursor synthesizing unit pertaining to Embodiment 2 of the present invention.

FIG. 14 shows an example of a synthesized display image generated by the cursor synthesizing unit 153. In FIG. 14, a plurality of cursors are synthesized.

FIG. 14 shows a synthesized display image 700, and cursors 701, 702 and 703.

The following describes operations of the pointer selecting unit 163, the cursor position calculating unit 164, and the cursor synthesizing unit 153.

The pointer selecting unit 163 selects pointers whose number corresponds to the number of displayable cursors by using the distance between the face and the fingertip of each operator, which has been acquired by the distance calculating unit 112. The pointer selecting unit 163 outputs information on the selected pointers (position information of a face and a fingertip, the distance between the face and the fingertip for each pointer). According to the present embodiment, the pointer selecting unit 163 preferentially selects one or more pointers having the larger distance within the limit of the number of displayable cursor.

Figure 16:
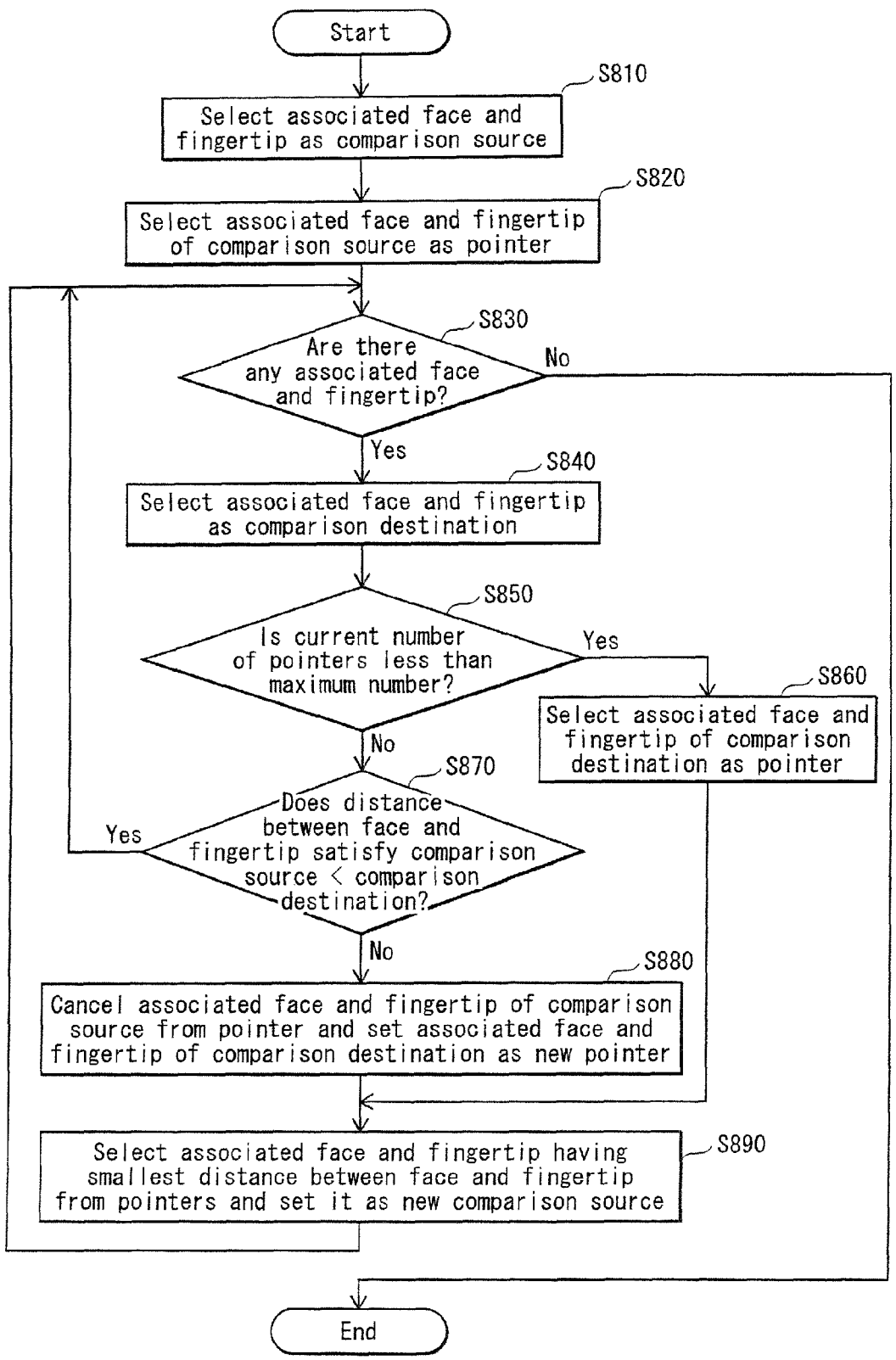
FIG. 16 is a flowchart showing one example of operations of a pointer selecting unit pertaining to Embodiment 2 of the present invention.

FIG. 16 is a flowchart showing operations of the pointer selecting unit 163. With reference to FIG. 16, description is made on operations for selecting pointers.

The pointer selecting unit 163 select one pair from among the pairs of associated faces and fingertips received from the pointer selecting unit 112. The selected pair is a comparison source pair (S810).

Subsequently, the pointer selecting unit 163 selects the comparison source pair as a pointer (S820).

Subsequently, the pointer selecting unit 163 judges whether there is any other association established between the face and the fingertip (S830). When there are some other associations between faces and fingertips, one of them is selected as a comparison destination pair (S840).

Subsequently, the pointer selecting unit 163 judges whether the current number of pointers is less than the maximum number of cursors (S850). When the current number of pointers reaches the maximum number of cursors (No in S850), the pointer selecting unit 163 compares the distance between the face and the fingertip of the comparison source pair and the distance between the face and the fingertip of the comparison destination pair (S860).

When the distance of the comparison destination pair is greater (No in S870), the comparison source pair is excluded from pointers, and the comparison destination pair is selected as a pointer (S880). Subsequently, from among the pairs selected as pointers, a pair having the smallest distance between the face and the fingertip is selected as a new comparison source pair (S890). After that, the pointer selecting unit 163 performs judgment on the remaining pairs (returning to S830).

In contrast, when the distance of the comparison source pair is greater (Yes in S870), the pointer selecting unit 163 performs no operation on the current comparison destination pair, and performs judgment on the remaining pairs (returning to S830).

When the number of current pointers is less than the maximum number of cursors (Yes in S850), the comparison destination pair is selected as a pointer (S860), and subsequently, from among the pairs selected as pointers, a pair having the smallest distance between the face and the fingertip is selected as a new comparison source pair (S890). After that, the pointer selecting unit 163 performs judgment on the remaining pairs (returning to S830).

When judgment is completed for all the pairs (No in S830), the pointer selecting unit 163 selects, as pointers, pairs that are currently selected as pointers.

Further, based on information on the plurality of pointers received from the pointer selecting unit 163, the cursor position calculating unit 164 calculates positions of a plurality of cursors to be displayed, and outputs the calculated positions as cursor position information.

Further, the cursor synthesizing unit 153 receives information output by the pointing control device 151 on the plurality of cursor positions, and superimposes the plurality of cursors on an image to be displayed so as to generate a synthesized display image.

Figure 15:
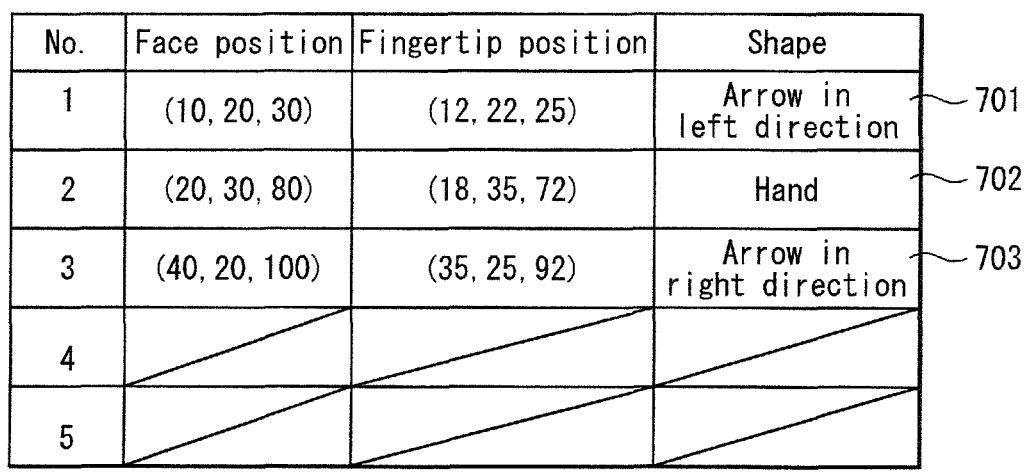
FIG. 15 shows one example of management information for managing a plurality of pointers pertaining to Embodiment 2 of the present invention.

FIG. 15 shows one example of management information for managing a plurality of pointers. In FIG. 15, the number of displayable cursors is three in a similar manner to FIG. 14. FIG. 15 shows an example in which information is managed in the form of a table.

In FIG. 15, the management information includes, for each pointer, an identifier (No.) for identifying a pointer, a face position, a fingertip position, and a shape of a cursor. The identifier (No.) for identifying a pointer is generated based on the judgment, as described in Embodiment 1, as to whether a pointer is the same. The cursor synthesizing unit 153 determines, as No. 1, an identifier of a new pointer, when a distance between a face position of the new pointer and a face position of an immediately previous pointer whose identifier is No. 1 is less than the threshold value, for example.

The cursor synthesizing unit 153 assigns a cursor different in shape to each identifier. While one pointer maintains authority to move a cursor, the cursor synthesizing unit 153 controls the assigned cursor to maintain its shape such that the shape of the cursor does not change while operations are in progress.

<Summary>

Thus the pointing control device pertaining to the present embodiment allows for selecting a plurality of pointers and assigning a cursor to each of the plurality of pointers.

Further, the pointing control device pertaining to the present embodiment does not assign a cursor to a person who appears in the image as a subject but does not perform a pointing operation, and allows for preventing display of unnecessary Cursors.

Embodiment 3

A display control apparatus equipped with a pointing control device pertaining to the present embodiment can connect to a plurality of input/output terminals, and allows for sharing the same screen and operating the same cursor in a plurality of locations.

When a conference is held in different locations, a display device and a camera are provided in each location, and operators attending the conference perform pointing operations while viewing a screen displayed on the display device provided in each location.

Figure 17:
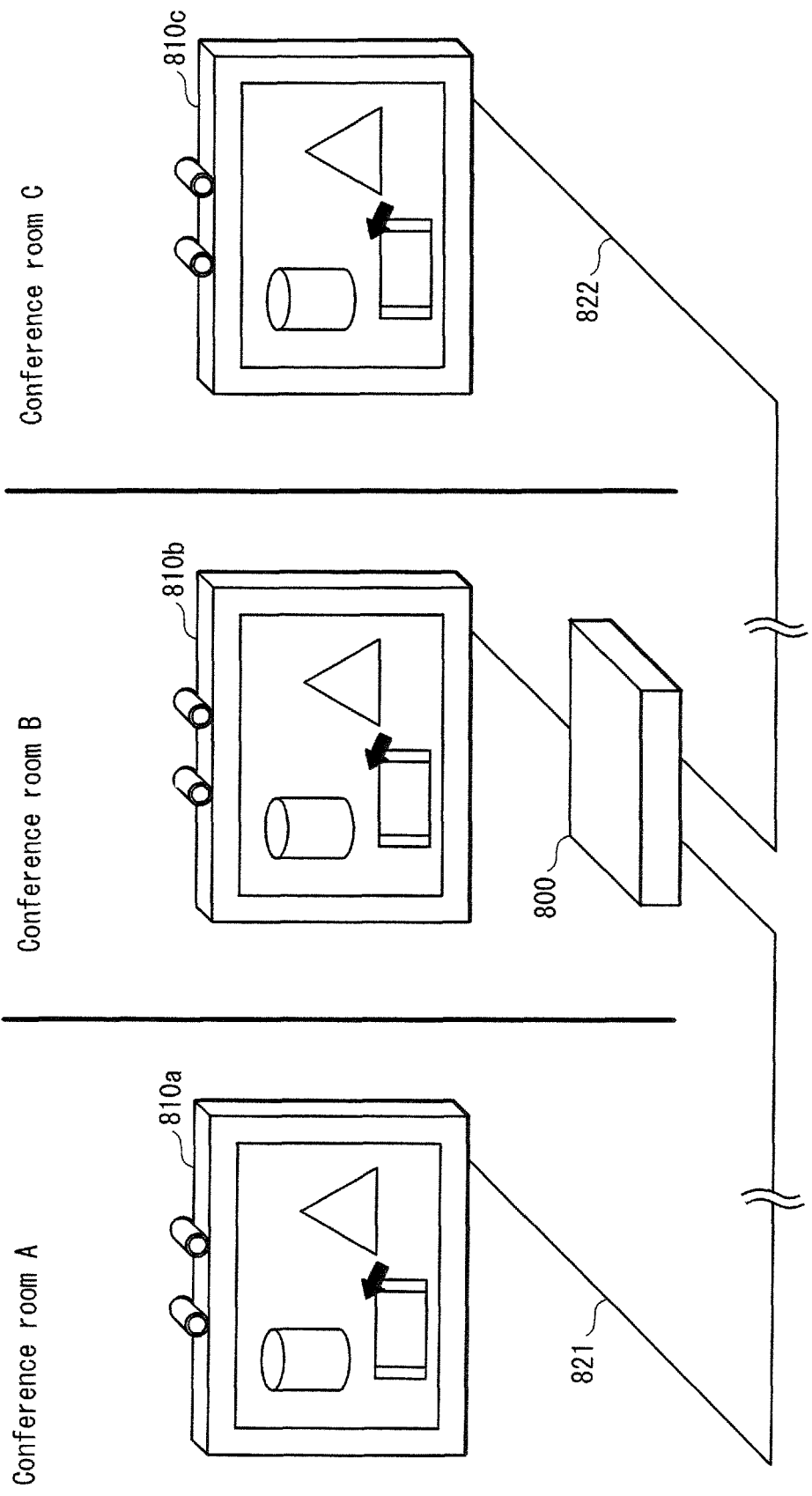
FIG. 17 shows one example of the system configuration of a display control apparatus pertaining to Embodiment 3 of the present invention.

FIG. 17 shows the system configuration of a display control apparatus pertaining to the present embodiment.

FIG. 17 shows an example of a conference involving three locations (conference rooms A, B and C). In a conference room A, an input/output terminal 810a is provided. In a conference room B, an input/output terminal 810b and a display control apparatus 800 equipped with a pointing control device are provided. In a conference room C, an input/output terminal 810c is provided.

The display control apparatus 800 equipped with the pointing control device is connected to the input/output terminal 810a in the conference room A via a network 821, and an input/output terminal 810c in the conference room C via a network 822.

The display control apparatus 800 equipped with the pointing control device inputs images photographed by cameras of the input/output terminals 810a and 810c provided in other locations via the networks 821 and 822. The display control apparatus 800 detects face positions and fingertip positions based on images photographed by cameras of the input/output terminals 810a, 810b and 810c, selects a pointer, and calculates a cursor position of the pointer. The display control apparatus 800 can associate a face position with a fingertip position and calculate the distance between the face and the fingertip by associating the face and the fingertip with information on a location. For example, information on an input/output terminal that photographed an image is added to information on a face position and information on a fingertip position.

The display control apparatus 800 outputs the same image to the display devices of the input/output terminal 810a and 810c in other locations via the networks 821 and 822. The display control apparatus 800 equipped with the pointing control device selects a pointer who has authority to move the cursor from among operators attending in the different locations, and outputs, to the display devices in the plurality of locations, a synthesized display image into which the cursor is synthesized.

<Summary>

As described above, the display control apparatus pertaining to the present embodiment can share the same screen in a plurality of locations via networks when a conference is held in the plurality of locations. Further, the pointing control device pertaining to the present embodiment can select a pointer who has authority to move the cursor from among operators attending in the plurality of locations, and easily change the pointer. Further, a pointer can appropriately move the cursor for determining a position to be pointed by moving a fingertip toward a camera regardless of the distance from the camera that is in operation.

Further, since the pointing control device pertaining to the present embodiment selects a pointer by using the distance between the face and the fingertip, even when a conference room in each location has a different size or layout, a pointer can be appropriately selected regardless of such external factors compared to the case where a pointer is selected by using the distance between a camera and a fingertip.

Other Modifications Pertaining to the Present Embodiment (1) In Embodiment 1, the camera 201 is composed of a pair of two cameras, but the present invention is not necessarily limited to this case. For example, the camera 201 may be realized as a combination of one camera and a distance detecting unit such as an infrared sensor camera. In this case, the face detecting unit 122 and the fingertip detecting unit 123 can detect positions of a face and a fingertip by detecting horizontal and vertical positions of the face and the fingertip with use of an image photographed by a normal camera, and by detecting the distances between these subjects and the camera with use of the infrared sensor camera.

(2) In Embodiment 1, the input/output terminal 200 is composed of the display device 202 realized by a large liquid-crystal display and the camera 201 placed on the display device 202, but the present invention is not necessarily limited to this case. The display device 202 may be realized as a plasma display, an organic EL display, a projector or the like. Further, the display device 202 may be realized by a television image receiver, and the display control apparatus 100 may be realized by part of an integrated circuit included in the television image receiver. Further, the camera 201 is not limited to be placed on the display device 202, and may be placed on any place from which the camera can image an operator as a subject, such as a wall or a ceiling of a conference room, for example.

(3) In Embodiment 1, a feature point of a face is a point closest to the camera 201 within the outer frame of the face, but the present invention is not necessarily limited to this case. A feature point may be a tip of a nose regardless of the distance from the camera 201, for example. Alternatively, it is possible to treat, as part of a face, an object that integrally moves with the face and is not be separated while being imaged. For example, when an operator wears glasses, a certain point on the glasses may serve as a feature point of a face.

Also, in Embodiment 1, a feature point of a fingertip is a point closest to the camera 201 within the outline of a hand, but the present invention is not necessarily limited to this case. A feature point of a fingertip may be a tip of an index finger regardless of the distance of the camera 201.

(4) In Embodiment 1, a pointing operation is performed by a fingertip, but the present invention is not necessarily limited to this case. A pointing operation may be performed by a tip of a writing instrument or a pointer stick in a hand, for example. The fingertip detecting unit 123 realizes this by detecting a hand and an object in the hand such as a writing instrument with image recognition using a frame, color and the like, and by acquiring a position of a tip of the object in the hand as a position of a feature point instead of a position of a fingertip. Thus, a tip of a writing instrument in a hand can be used as a substitute for a fingertip.

Note that a substitute for a fingertip is not limited to a writing instrument, a pointer stick and the like. Any object that can indicate a position and a direction, and easily approach or recede from a face can serve as a substitute for a fingertip.

(5) In Embodiment 1, the position acquiring unit 111 is provided with the image input unit 121, the face detecting unit 122 and the fingertip detecting unit 123, but the present invention is not necessarily limited to this case. The position acquiring unit 111 may receive information on a face position and information on a fingertip position from another pointing control device, a device for detecting positions of a face and a fingertip and the like.

(6) In Embodiment 1, within a frame of a field of view of the camera according to which horizontal and vertical positions of a face and a fingertip are calculated, the lower left corner of the frame is set as the origin, and the upper right corner is set as (200, 150), but the present invention is not necessarily limited to this case. The lengths of four sides of a frame of a field of view of the camera may be any values according to camera resolution, and the shape of the frame is not limited to a rectangle. Further, an origin may be placed at any point such as the center of the frame or the upper left corner of the frame. Further, in Embodiment 1, a direction from the left to the right of the X axis is defined as the horizontal direction, and a direction from the top to the bottom of the Y axis is defined as the vertical direction, but any coordinate system may be used. For example, a direction from the right to the left of the X axis may be defined as the horizontal direction, and a direction from the bottom to the top of the Y axis may be defined as the vertical direction.

(7) In Embodiment 1, the distance calculating unit 112 sequentially searches for a fingertip corresponding to each face, starting from a face closest to the camera, but the present invention is not necessarily limited to this case. For example, the distance calculating unit 112 may sequentially search for a fingertip corresponding to each face, starting from a face farthest from the camera, or may search for a fingertip in an order of reception of fingertip positions from the position acquiring unit 111. Alternatively, the distance calculating unit 112 may select a fingertip first, and then search for a face corresponding to the fingertip.

(8) In Embodiment 1, the distance calculating unit 112 associates a face with a fingertip that is closer to the camera 201a than the face is and closest to the face, but the present invention is not necessarily limited to this case. For example, each of the face detecting unit 122 and the fingertip detecting unit 123 may output identification information unique to each face or to each fingertip in addition to position information, and perform association by using the identification information. Further, a threshold value may be set for the distance between the face and the fingertip, and when the distance between the face and the fingertip exceeds the threshold value, a combination of the face and the fingertip may be excluded. Further, by using a difference between a value of Z of a face position and a value of Z of a fingertip position or a difference between a value of X of a face position and a value of X of a fingertip position, a combination of a face and a fingertip whose difference therebetween exceeds the threshold value may be excluded.

(9) In Embodiment 1, the cursor position calculating unit 114 judges that a pointer has changed to another pointer when the distance between a face position of the immediately previous pointer and a face position of the new pointer exceeds a threshold value, which is ½ of the distance between the center of a seat and the center of an adjacent seat. However, the present invention is not necessarily limited to this case. A threshold value is not limited to ½ of the distance between the center of a seat and the center of an adjacent seat, and may be the width of a seat, for example. Alternatively, any value such as a predetermined value that is not dependent on a conference room may be used. Further, the cursor position calculating unit 114 may receive face position information of people other than a pointer from the position acquiring unit 111, and ½ of the distance between a face of the pointer and a face of a person closest to the pointer's face may serve as a threshold value.

Alternatively, the face detecting unit 122 may output a piece of identification information unique to each face together with face position information thereof, and the cursor position calculating unit 114 may judge whether a pointer has changed to another by comparing two pieces of identification information output by the face detecting unit 122. This allows more accurate judgment using image recognition as to whether a pointer is the same.

(10) In Embodiment 1, the cursor position calculating unit 114 sets the initial cursor position as the center of the image, but the present invention is not necessarily limited to this case. For example, the initial cursor position may be a certain position such as an upper left corner of the display image. Further, the initial cursor position may be the intersection of a straight line running from a fingertip to the display device and a screen of the display device.

(11) In Embodiment 1, the predetermined cursor position used by the cursor synthesizing unit 103 is positioned at an upper left corner of the display image, but the present invention is not necessarily limited to this case. For example, the predetermined cursor position may be any coordinate position such as the center of the display image. Alternatively, the predetermined cursor position may be a position at which a previous cursor was synthesized. Note that the predetermined cursor position may be the same as or different from the initial cursor position stored in the cursor position calculating unit 114.

Further, the cursor synthesizing unit 103 may not store therein a predetermined cursor position, and when the pointing control device 101 does not output a cursor position, the cursor synthesizing unit 103 may not synthesize the cursor and output an image input from the display image input unit 102 from the image output unit 104 without change. This allows removal of the cursor so as not to obstruct a displayed image when there is no pointer.

(12) In Embodiment 1, the display image input unit 102 receives an image to be displayed from a personal computer via an HDMI input port, but the present invention is not necessarily limited to this case. The display image input unit 102 may be provided with any interface that can receive an image to be displayed such as an analog RGB input port, a DVI input port, a Display Port input port or a composite input port. Further, a device that outputs an image to be displayed is not limited to a personal computer, and may be any image output device such as a BD player.

Alternatively, the display image input unit 102 may be provided with an interface that receives an image to be displayed from a recording medium or a network, such as a memory card reader that receives an image to be displayed as a file from a memory device such as a SDXC memory card.

(13) In Embodiment 1, the cursor synthesizing unit 103 synthesizes the cursor into an image input from the display image input unit 102 in accordance with the cursor position information output by the cursor position calculating unit 114, but the present invention is not necessarily limited to this case. For example, the display control apparatus 100 may not be provided with the display image input unit 102, the cursor synthesizing unit 103 and the image output unit 104, the pointing control device 101 may be provided with a USB interface using Human Interface Device (HID) class or a PS/2 mouse interface and output cursor position information calculated by the cursor position calculating unit 114 to a personal computer, and the personal computer may synthesize the cursor into an image to be displayed by using the cursor position information. This saves the trouble of causing the display control apparatus to synthesize the cursor, and enables the personal computer to directly output an image to the display device 202 by causing the personal computer to perform cursor synthesizing processing.

(14) In Modification 1 of Embodiment 1, a linear function represents the relationship between the rate of cursor movement and the distance between the face and the fingertip, but the present invention is not necessarily limited to this case. For example, the distance between the face and the fingertip may be inversely proportional to the rate of cursor movement, and their relationship may be represented by another function. Further, a transform table may define the relationship between the rate of cursor movement and the distance between the face and the fingertip, for example. In this case, the distance between the face and the fingertip may be transformed to the rate of cursor movement by using the table to calculate the distance the cursor moves.

(15) In Embodiment 2, an identifier (No.) for identifying a pointer is generated based on the judgment, as described in Embodiment 1, as to whether a pointer is the same, but the present invention is not necessarily limited to this case. For example, as described in the above modification (9), the face detecting unit 122 may output identification information unique to each face, and an identifier (No.) for identifying a pointer may be generated based on the identification information unique to each face.

Further, the management information may store therein information for specifying a cursor such as the size or color of the cursor, other than the shape.

(16) In Embodiment 3, the display control apparatus 800 equipped with the pointing control device adds information on an input/output terminal that photographed an image to information on a face position and information on a fingertip position, but the present invention is not necessarily limited to this case. For example, position information on a fingertip and a face may be acquired by defining coordinate systems (origin positions) in one-to-one correspondence with a location A, a location B and a location C, so as not to overlap with one another. This can prevent association of a face of a certain location with a fingertip of another location.

(17) In Embodiment 3, the display control apparatus 800 equipped with the pointing control device receives images photographed by cameras of the input/output terminals 810*a* and 810*c* in other locations via the networks 821 and 822, but the present invention is not necessarily limited to this case. For example, the input/output terminal 810*a* may be provided with the position acquiring unit 111 connected to a camera, and the input/output terminal 810*a* may output face position information and fingertip position information to the position acquiring unit 111 of the display control apparatus 800 via the network 821. Alternatively, the input/output terminal 810*a* may be provided with the position acquiring unit 111 and the distance calculating unit 112 that are connected to the camera, and the input/output terminal 810*a* may output information on the distance between the face and the fingertip to the pointer selecting unit 113 of the display control apparatus 800 via the network 821. This saves the trouble of causing the network 821 to directly transmit an image photographed by the camera, and can improve the efficiency of the network. Note that it is natural that the input/output terminal 810*c* and the network 822 may have the same structure.

Alternatively, the conference room C may be provided with a display control apparatus that is connected to the input/output terminal 810*c* and not equipped with the pointing control device 101, and the display control apparatus 800 may output cursor position information to the display control apparatus in the conference room C via the network 822. This enables the display control apparatus in the conference room C to output a cursor to the input/output terminal 810*c* by using the cursor position information, and accordingly, the network 822 is not required to directly transmit an image into which the cursor has been synthesized. As a result, the efficiency of the network can be improved. Note that it is natural that the input/output terminal 810*a* and the network 821 may have the same structure.

Alternatively, the input/output terminal 810*a* of the conference room A may be realized by a mobile phone terminal that includes a camera, a display screen and a network function. This realizes the conference room A by using a room of a house of an operator who owns the mobile phone, and enables the operator to attend the conference from his/her house.

(18) The pointing control device pertaining to each of the Embodiments and Modifications may be partially or completely realized as an integrated circuit composed of one chip or a plurality of chips, as a computer program, or as any form. For example, the display control apparatus equipped with the pointing control device may be realized in one chip, or only the pointing control device may be realized in one chip and the cursor synthesizing unit and the like may be realized in another chip.

When being achieved as an integrated circuit, the pointing control device is typically achieved as Large Scale Integration (LSI). Although referred to here as an LSI, depending on the degree of integration, the terms IC, system LSI, super LSI, or ultra LSI are also used.

In addition, the method for assembling integrated circuits is not limited to LSI, and a dedicated circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used.

Furthermore, if technology for forming integrated circuits that replace LSIs emerges, owing to advances in semiconductor technology or to another derivative technology, the integration of functional blocks may naturally be accomplished using such technology.

Figure 18:
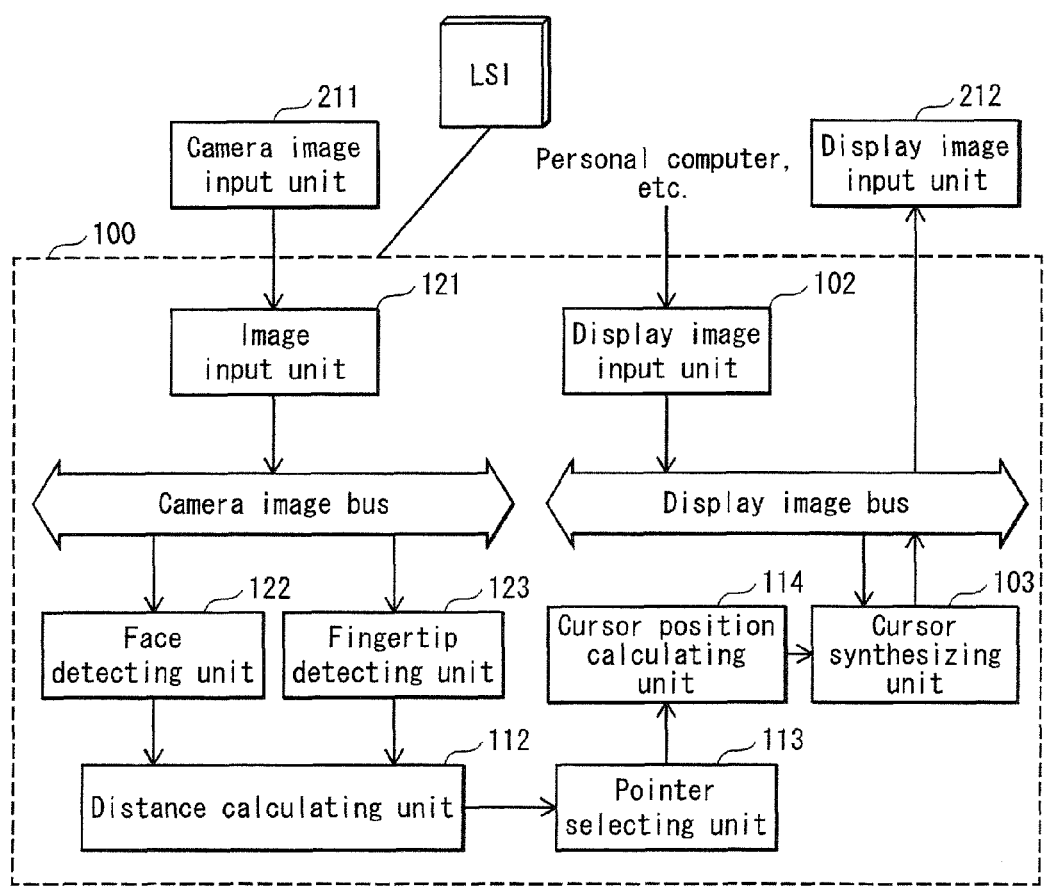
FIG. 18 shows one example of the configuration in which the pointing control device pertaining to Embodiment 1 of the present invention is an integrated circuit.

For example, an example of an integrated circuit is realized by the structure of FIG. 18.

In FIG. 18, the display control apparatus 100 is implemented as an integrated circuit. Each component of the display control apparatus 100 is the same as that of Embodiment 1, and is assigned the same reference number. A description of structural elements that are the same as those of Embodiment 1 is omitted. The display control apparatus 100 receives an image photographed by a camera from the camera image input unit 211, and outputs a synthesized display image to the image output unit 212. The camera image input unit 211 inputs the image to the image input unit 121. Further, the image output unit 212 outputs an image that is output from the image output unit 104 (unillustrated).

Further, the pointing control device pertaining to the present invention may be realized by a program stored in a recording medium and a computer that reads and executes the program. The recording medium may be any recording medium such as a memory card and a CD-ROM. Further, the pointing control device pertaining to the present invention may be realized by a program downloaded via a network and a computer that downloads a program from a network and executes the program. This program is a program executing pointing processing, the program comprising the steps of: acquiring, for each operator, a position of a face and acquiring a position of a fingertip or a substitute for a fingertip; associating, for each operator, the position of the face with the position of the fingertip or the substitute, and calculating, for each operator, a distance between the position of the face and the associated position of the fingertip or the substitute; selecting the pointer by using the distance; and calculating the position of the cursor by using the position of the fingertip or the substitute acquired for the pointer, and outputting the position of the cursor. Note that in this case, a personal computer outputting an image to be displayed may be the same hardware as a computer that reads and executes the above program.

Further, the present invention is useful not only for usage in a certain location, i.e., a conference room, but useful in a pointing operation performed on a television at home, and as a pointing device for a personal computer, a mobile phone, a mobile information terminal, a video camera, a digital camera and the like.

(19) Each embodiment or each modification is simply an example, and the present invention is not limited to the above descriptions. Various modifications in the scope of the present invention are expected.

The following describes the structures and effects of the pointing control device, an integrated circuit thereof and a pointing control method, pertaining to the embodiments.

(a) A pointing control device pertaining to the embodiments is a pointing control device for selecting, from operators who perform a pointing operation of pointing at a position on a screen, a pointer who is allowed to determine a position of a cursor displayed on the screen, the pointing control device comprising: a position acquiring unit configured to, for each operator, acquire a position of a face and acquire a position of a fingertip or a substitute for a fingertip; a distance calculating unit configured to associate, for each operator, the position of the face with the position of the fingertip or the substitute, and to calculate, for each operator, a distance between the position of the face and the associated position of the fingertip or the substitute; a pointer selecting unit configured to select the pointer by using the distance; and a cursor position calculating unit configured to calculate the position of the cursor by using the position of the fingertip or the substitute acquired for the pointer, and to output the position of the cursor.

Further, an integrated circuit pertaining to the embodiments is an integrated circuit for selecting, from operators who perform a pointing operation of pointing at a position on a screen, a pointer who is allowed to determine a position of a cursor displayed on the screen, the integrated circuit comprising: a position acquiring unit configured to, for each operator, acquire a position of a face and acquire a position of a fingertip or a substitute for a fingertip; a distance calculating unit configured to associate, for each operator, the position of the face with the position of the fingertip or the substitute, and to calculate, for each operator, a distance between the position of the face and the associated position of the fingertip or the substitute; a pointer selecting unit configured to select the pointer by using the distance; and a cursor position calculating unit configured to calculate the position of the cursor by using the position of the fingertip or the substitute acquired for the pointer, and to output the position of the cursor.

Further, a pointing control method pertaining to the embodiments is a pointing control method for selecting, from operators who perform a pointing operation of pointing at a position on a screen, a pointer who is allowed to determine a position of a cursor displayed on the screen, the pointing control method comprising the steps of: acquiring, for each operator, a position of a face and acquiring a position of a fingertip or a substitute for a fingertip; associating, for each operator, the position of the face with the position of the fingertip or the substitute, and calculating, for each operator, a distance between the position of the face and the associated position of the fingertip or the substitute; selecting the pointer by using the distance; and calculating the position of the cursor by using the position of the fingertip or the substitute acquired for the pointer, and outputting the position of the cursor.

With the above structure, the pointer who determines a position to be pointed can be selected by using the distance between the face and the fingertip, and the pointer can perform a pointing operation without being affected by other operators. Further, the pointer can easily change to another operator when they change the distances.

(b) Further, in the pointing control device of the above item (a) pertaining to the embodiments, the position acquiring unit may acquire, for each operator, the position of the face and the position of the fingertip or the substitute as three-dimensional information, and the distance calculating unit may generate a plurality of pairs each including a position of one face and a position of one fingertip or a substitute for one fingertip associated with the one face, and may calculate the distance for each pair.

Thus, it is possible to correctly acquire the distance between the face and the fingertip or the substitute regardless of the positional relationship between the face and the fingertip or the substitute, and it becomes possible to generate the plurality of pairs by sequentially associating one face with a corresponding one of fingertips and to select the pointer among the pairs.

(c) Further, in the pointing control device of the above item (b) pertaining to the embodiments, the pointer selecting unit may select the pointer by comparing the pairs in terms of the distance.

Changing the distance between the face and the fingertip or the substitute allows any operator to be the pointer, and then this enables the pointer to easily change to another pointer.

(d) Further, in the pointing control device of the above item (c) pertaining to the embodiments, the pointer selecting unit may select one of the pairs having the largest distance as the pointer.

This enables an operator keeping his/her fingertip or the substitute away from his/her face to be the pointer.

(e) Further, in the pointing control device of the above item (b) pertaining to the embodiments, the pointer selecting unit may compare the pairs in terms of the distance, and select a plurality of pairs each of which is the pointer, from all the pairs, and the cursor position calculating unit may calculate the position of the cursor for each pointer, by using the position of the fingertip or the substitute, and may output the position of the cursor for each pointer.

This enables each of a plurality of pointers to perform a pointing operation at the same time.

(f) Further, in the pointing control device of the above item (e) pertaining to the embodiments, the pointer selecting unit may select the plurality of pairs as the pointers in descending order of the distance among all the pairs.

This enables a plurality of operators keeping their fingertips away from their faces to be pointers at the same time.

(g) Further, in the pointing control device of the above item (a) pertaining to the embodiments, the position acquiring unit may include: an image acquiring unit configured to acquire, from a plurality of cameras, images in which the operators are captured; a face position detecting unit configured to detect the position of the face of each operator based on the images; and a fingertip position detecting unit configured to detect the position of the fingertip or the substitute of each operator based on the images.

This enables the pointing control device to acquire the distance between the face and the fingertip or the substitute based on images captured by the plurality of cameras to select the pointer.

(h) Further, in the pointing control device of the above item (a) pertaining to the embodiments, the cursor position calculating unit may store therein information for identifying a previous pointer, may determine whether the pointer selected by the pointer selecting unit is the same as the previous pointer, and when the pointer is the same as the previous pointer, may calculate the position of the cursor by using a direction in which the fingertip or the substitute of the pointer has moved as a direction in which the cursor has moved.

When the same pointer keeps performing a pointing operation, the direction in which the cursor moves coincides with the direction in which the fingertip or the substitute moves, and accordingly this enables the pointer to intuitively control a cursor position.

(j) Further, in the pointing control device of the above item (h) pertaining to the embodiments, the cursor position calculating unit may store therein a previous position of the cursor, may calculate, by using the distance of the pointer, a distance that the cursor moves, and may output, as the position of the cursor, a position to which the cursor has been moved from the previous position by the calculated distance in the direction in which the cursor has moved.

This allows controlling, as intended by the pointer, the relationship between the distance that the fingertip or the substitute moves and the distance that the cursor moves by moving the fingertip or the substitute close/away to/from a face, and enables the pointer to more correctly control a cursor movement.

(k) Further, in the pointing control device of the above item (h) pertaining to the embodiments, when the pointer selected by the pointer selecting unit is not the same as the previous pointer, the cursor position calculating unit may output an initial position of the cursor as a cursor position.

When a pointer has changed to another pointer, this enables a new pointer to start pointing based on a predetermined cursor position regardless of the current position.

INDUSTRIAL APPLICABILITY

The pointing control device pertaining to the present invention has the function of selecting a pointer who determines a position to be pointed by using the distance between a face of each operator and a fingertip or a substitute for a fingertip of each operator, and is useful for a conference system. In addition, the pointing control device can be applied to a personal computer, a mobile phone, a mobile information terminal, a video camera, a digital camera and the like.

REFERENCE SIGNS LIST 100, 800 display control apparatus
101 pointing control device
102 display image input unit
103 cursor synthesizing unit
104 image output unit
111 position acquiring unit
112 distance calculating unit
113 pointer selecting unit
114 cursor position calculating unit
121 image input unit
122 face detecting unit
123 fingertip detecting unit
200, 810a, 810b, 810c input/output terminal
201 camera
202 display device
211 camera image input unit
212 display image input unit

The invention claimed is:

1. A pointing control device for selecting, from operators who perform a pointing operation of pointing at a position on a screen, a pointer who is allowed to determine a position of a cursor displayed on the screen, the pointing control device comprising:
a position acquiring unit configured to, for each operator, acquire a position of a face and acquire a position of a fingertip or a substitute for a fingertip;

a distance calculating unit configured to associate, for each operator, the position of the face with the position of the fingertip or the substitute, and to calculate, for each operator, a distance between the position of the face and the associated position of the fingertip or the substitute;

a pointer selecting unit configured to select the pointer by using the distance; and a cursor position calculating unit configured to calculate the position of the cursor by using the position of the fingertip or the substitute acquired for the pointer, and to output the position of the cursor.

2. The pointing control device of claim 1, wherein
the position acquiring unit acquires, for each operator, the position of the face and the position of the fingertip or the substitute as three-dimensional information, and
the distance calculating unit generates a plurality of pairs each including a position of one face and a position of one fingertip or a substitute for one fingertip associated with the one face, and calculates the distance for each pair.

3. The pointing control device of claim 2, wherein
the pointer selecting unit selects the pointer by comparing the pairs in terms of the distance.

4. The pointing control device of claim 3, wherein
the pointer selecting unit selects one of the pairs having the largest distance as the pointer.

5. The pointing control device of claim 2, wherein
the pointer selecting unit compares the pairs in terms of the distance, and selects a plurality of pairs each of which is the pointer, from all the pairs, and
the cursor position calculating unit calculates the position of the cursor for each pointer, by using the position of the fingertip or the substitute, and outputs the position of the cursor for each pointer.

6. The pointing control device of claim 5, wherein
the pointer selecting unit selects the plurality of pairs as the pointers in descending order of the distance among all the pairs.

7. The pointing control device of claim 1, wherein
the position acquiring unit includes:
an image acquiring unit configured to acquire, from a plurality of cameras, images in which the operators are captured;
a face position detecting unit configured to detect the position of the face of each operator based on the images; and
a fingertip position detecting unit configured to detect the position of the fingertip or the substitute of each operator based on the images.

8. The pointing control device of claim 1, wherein
the cursor position calculating unit
stores therein information for identifying a previous pointer,
determines whether the pointer selected by the pointer selecting unit is the same as the previous pointer, and
when the pointer is the same as the previous pointer, calculates the position of the cursor by using a direction in which the fingertip or the substitute of the pointer has moved as a direction in which the cursor has moved.

9. The pointing control device of claim 8, wherein
the cursor position calculating unit
stores therein a previous position of the cursor, and
when the pointer is the same as the previous pointer, in the calculation of the position of the cursor, the cursor position calculating unit:
calculates, by using the distance of the pointer, a distance that the cursor moves, and
outputs, as the position of the cursor, a position to which the cursor has been moved from the previous position by the calculated distance in the direction in which the cursor has moved.

10. The pointing control device of claim 8, wherein
when the pointer selected by the pointer selecting unit is not the same as the previous pointer, the cursor position calculating unit outputs an initial position of the cursor as a cursor position.

11. An integrated circuit for selecting, from operators who perform a pointing operation of pointing at a position on a screen, a pointer who is allowed to determine a position of a cursor displayed on the screen, the integrated circuit comprising:

a position acquiring unit configured to, for each operator, acquire a position of a face and acquire a position of a fingertip or a substitute for a fingertip;

a distance calculating unit configured to associate, for each operator, the position of the face with the position of the fingertip or the substitute, and to calculate, for each operator, a distance between the position of the face and the associated position of the fingertip or the substitute;

a pointer selecting unit configured to select the pointer by using the distance; and a cursor position calculating unit configured to calculate the position of the cursor by using the position of the fingertip or the substitute acquired for the pointer, and to output the position of the cursor.

12. A pointing control method for selecting, from operators who perform a pointing operation of pointing at a position on a screen, a pointer who is allowed to determine a position of a cursor displayed on the screen, the pointing control method comprising the steps of:

acquiring, for each operator, a position of a face and acquiring a position of a fingertip or a substitute for a fingertip;

associating, for each operator, the position of the face with the position of the fingertip or the substitute, and calculating, for each operator, a distance between the position of the face and the associated position of the fingertip or the substitute;

selecting the pointer by using the distance; and calculating the position of the cursor by using the position of the fingertip or the substitute acquired for the pointer, and outputting the position of the cursor.

\* \* \* \* \*